US010078222B2

(12) United States Patent
Komatsu et al.

(10) Patent No.: US 10,078,222 B2
(45) Date of Patent: Sep. 18, 2018

(54) LIGHT GUIDE DEVICE AND VIRTUAL-IMAGE DISPLAY DEVICE

(71) Applicant: SEIKO EPSON CORPORATION, Tokyo (JP)

(72) Inventors: Akira Komatsu, Tatsuno-machi (JP); Takahiro Totani, Suwa (JP); Takashi Takeda, Suwa (JP); Masayuki Takagi, Matsumoto (JP); Toshiaki Miyao, Matsumoto (JP); Hayato Matsuki, Suwa (JP)

(73) Assignee: SEIKO EPSON CORPORATION, Tokyo (JP)

( * ) Notice: Subject to any disclaimer, the term of this patent is extended or adjusted under 35 U.S.C. 154(b) by 0 days.

(21) Appl. No.: 15/425,209

(22) Filed: Feb. 6, 2017

(65) Prior Publication Data

US 2017/0255014 A1    Sep. 7, 2017

(30) Foreign Application Priority Data

Mar. 7, 2016  (JP) ................. 2016-043089
Mar. 7, 2016  (JP) ................. 2016-043090

(51) Int. Cl.
  *G02B 27/01*    (2006.01)
  *G02B 27/28*    (2006.01)
  (Continued)

(52) U.S. Cl.
  CPC ....... *G02B 27/0172* (2013.01); *G02B 5/3041* (2013.01); *G02B 6/0035* (2013.01);
  (Continued)

(58) Field of Classification Search
  CPC .............. G02B 27/0172; G02B 5/3041; G02B 6/0035; G02B 6/0055; G02B 6/0056; G02B 27/0101; G02B 27/285
  (Continued)

(56) References Cited

U.S. PATENT DOCUMENTS 6,829,095 B2 *  12/2004  Amitai ................ G02B 6/0018
                                                          359/629
7,391,573 B2 *   6/2008  Amitai ................ G02B 6/0056
                                                            345/7

(Continued)

FOREIGN PATENT DOCUMENTS

WO    2006/085308 A1    8/2006
WO    2007/062098 A2    5/2007
WO    2016/027442 A1    2/2016

OTHER PUBLICATIONS

Jul. 14, 2017 Extended European Search Report issued in Patent Application No. 17159461.7.

*Primary Examiner* — Frank Font
(74) *Attorney, Agent, or Firm* — Oliff PLC

(57) ABSTRACT

A light guide device includes an incident section, a parallel light guide body for light guide, and an emitting section. The emitting section includes a reflection unit formed by arraying a plurality of mirrors. The plurality of mirrors configuring the reflection unit are reflection elements having reflectance of P polarized light lower than reflectance of S polarized light. The plurality of mirrors configuring the reflection unit can be accompanied by wavelength plates to be adjacent to the mirrors.

21 Claims, 17 Drawing Sheets

(51) Int. Cl.
  *G02B 5/30* (2006.01)
  *F21V 8/00* (2006.01)
(52) U.S. Cl.
  CPC ......... *G02B 6/0055* (2013.01); *G02B 6/0056* (2013.01); *G02B 27/0101* (2013.01); *G02B 27/285* (2013.01); *G02B 2027/012* (2013.01); *G02B 2027/0118* (2013.01); *G02B 2027/0125* (2013.01)
(58) Field of Classification Search
  USPC ................. 359/485.04, 630, 636, 850, 855
  See application file for complete search history.

(56) References Cited

U.S. PATENT DOCUMENTS

| | | | | |
|---|---|---|---|---|
| 7,457,040 | B2 * | 11/2008 | Amitai | G02B 6/0018 345/7 |
| 7,613,373 | B1 * | 11/2009 | DeJong | G02B 6/0028 359/629 |
| 7,653,268 | B1 * | 1/2010 | DeJong | G02B 6/0028 359/485.01 |
| 7,710,655 | B2 * | 5/2010 | Freeman | G02B 5/1814 359/15 |
| 9,696,495 | B2 * | 7/2017 | Mei | G02B 6/2706 |
| 2003/0165017 | A1 * | 9/2003 | Amitai | G02B 6/0018 359/636 |
| 2009/0015929 | A1 * | 1/2009 | DeJong | G02B 27/0081 359/633 |
| 2009/0322653 | A1 * | 12/2009 | Putilin | G02B 17/006 345/8 |
| 2010/0245691 | A1 * | 9/2010 | Kawamura | G02B 27/28 349/9 |
| 2013/0163089 | A1 | 6/2013 | Bohn | |
| 2016/0025929 | A1 * | 1/2016 | Mei | G02B 6/2773 359/230 |
| 2016/0370524 | A1 * | 12/2016 | Sasaki | G02B 27/286 |
| 2017/0176747 | A1 * | 6/2017 | Vallius | G02B 27/0172 |
| 2017/0242249 | A1 * | 8/2017 | Wall | G02B 27/0172 |

* cited by examiner

LIGHT GUIDE DEVICE AND VIRTUAL-IMAGE DISPLAY DEVICE

BACKGROUND

1. Technical Field

The present invention relates to a light guide device used in a head mounted display or the like mounted on a head and used and a virtual-image display device incorporating the light guide device.

2. Related Art

In recent years, as a virtual-image display device that enables formation and observation of a virtual image like a head mounted display, there have been proposed various virtual-image display devices of a type for guiding video lights received from a display element to the pupils of an observer with a light guide plate.

For example, as a wearable display device that introduces a collimation image or the like into the visual field of an observer, there has been publicly known a wearable display device in which a large number of half mirrors (hereinafter referred to as "HMs" as well) inclined with respect to a principal plane and disposed in parallel to one another are incorporated in a light guide body having a parallel plane plate shape and video lights are reflected by the HMs and provided to the observer (see US 2013/0163089 (Patent Literature 1)). The device makes it possible to observe video lights from an imaging unit as a visible image by reflecting the video lights on the large number of HMs in the light guide body and extracting the video lights while viewing an ambient environment through the light guide body.

In the wearable display device described in Patent Literature 1, see-through view in a short distance is not taken into account. Specifically, when the wearable display device of this type is worn to observe an external object in a short distance, since an array-like HMs are disposed in front of an eye, direct light from the HM, which has transmitted external light, and indirect light reflected by the HM and reflected again by the HM adjacent to the HM are made incident on the eye from the same direction. That is, when the near object is viewed through the light guide body, a ghost is observed because of the indirect light doubly reflected on the HMs. Note that, if it is attempted to increase the transmittance of the HMs to capture more external light, video lights are darkened. On the other hand, if it is attempted to increase the reflectance of the HMs to increase an emitted light amount of the video lights, it is not easy to observe the external environment. For example, if a formation region of the HMs is limited to the front of the eye, the HM formation region is conspicuous in terms of exterior appearance.

Further, in Patent Literature 1, likelihood of occurrence of streak-like unevenness in a visible image in the wearable display device is not described. Specifically, in the case of the wearable display device of this type, since the array-like HMs are disposed in front of the eye, multiple reflection occurs in which lights reflected without being transmitted through the HMs at all and lights transmitted through the HMs once and reflected are made incident on the eye from the same direction. Brightness decreases stepwise according to the number of times of the reflection. Therefore, lights made incident on the eye from respective angle directions have a cyclic luminance distribution corresponding to an array interval in an array direction of the HMs. Since the luminance distribution discontinuously changes according to the angle direction of the lights, vertical streak-like unevenness is observed in the visible image.

SUMMARY

An advantage of some aspects of the invention is to provide a light guide device that can suppress a ghost image from being observed in see-through view in a short distance and a virtual-image display device incorporating the light guide device.

Another advantage of some aspects of the invention is to provide a light guide device that can suppress vertical streak-like unevenness from being observed in a visible image and a virtual-image display device incorporating the light guide device.

A light guide device according to a first aspect of the invention includes: a light guide body including a pair of opposed surfaces corresponding to an observer side and an external environment side; an incident section provided on one end side of the light guide body; and an emitting section provided on the other end side of the light guide body. The emitting section includes a reflection unit formed by arraying a plurality of mirrors that respectively emit video lights received from the incident section to the observer side. The plurality of mirrors are reflection elements having reflectance of P polarized light lower than reflectance of S polarized light. Note that the P polarized light means light, an electric field component of which is parallel to an incident surface of the mirror (the incident surface is in a perpendicular relation with a mirror surface and includes an incident ray and a reflected ray). The S polarized light means light, an electric field component of which is perpendicular to the incident surface.

With the light guide device, since the plurality of mirrors are the reflection elements having the reflectance of the P polarized light lower than the reflectance of the S polarized light, for example, when external light deviating to the P polarized light is made incident on the light guide device, it is possible to reduce external light reflected on a specific mirror, reflected again on a mirror adjacent to the specific mirror, and made incident on an eye with respect to external light made incident on the reflection unit, transmitted through the specific mirror, and made incident on the eye. Consequently, when a near object is viewed through the light guide body, it is possible to suppress a ghost from being observed because of indirect lights due to double reflection on the mirrors. When video light deviating to the S polarized light is made incident on the reflection unit through the light guide body, it is possible to suppress a decrease in luminance of the video light made incident on the reflection unit, reflected by the specific mirror, and made incident on the eye. It is possible to improve light use efficiency of the video light.

A light guide device according to a second aspect of the invention includes: a light guide body including a pair of opposed surfaces corresponding to an observer side and an external environment side; an incident section provided on one end side of the light guide body; and an emitting section provided on the other end side of the light guide body. The emitting section includes a reflection unit formed by arraying a plurality of mirrors that respectively emit video lights from the incident section to the observer side. The reflection unit includes a plurality of wavelength plates disposed to correspond to the respective plurality of mirrors. The plurality of mirrors are reflection elements having reflectance of P polarized light lower than reflectance of S polarized light. Note that the P polarized light means light, an electric field component of which is parallel to an incident surface of the mirror (the incident surface is in a perpendicular relation with a mirror surface and includes an incident ray and a reflected ray). The S polarized light means light, an electric field component of which is perpendicular to the incident surface.

With the light guide device, since the light guide device includes the plurality of wavelength plates disposed to correspond to the respective plurality of mirrors and the plurality of mirrors are the reflection elements having the reflectance of the P polarized light lower than the reflectance of the S polarized light, it is easy to balance the luminance of the video light made incident on the reflection unit, reflected on a specific mirror, and made incident on the eye and the luminance of the video light transmitted through the specific mirror, reflected on a mirror adjacent to the specific mirror, and made incident on the eye. It is possible to suppress vertical streak-like unevenness from being observed in a visible image.

BRIEF DESCRIPTION OF THE DRAWINGS

The invention will be described with reference to the accompanying drawings, wherein like numbers reference like elements.

FIG. 2 is a diagram for explaining, in a cross section including an optical axis, optical paths of video lights in the light guide device or the like.

DESCRIPTION OF EXEMPLARY EMBODIMENTS

First Embodiment

Figure 1A:
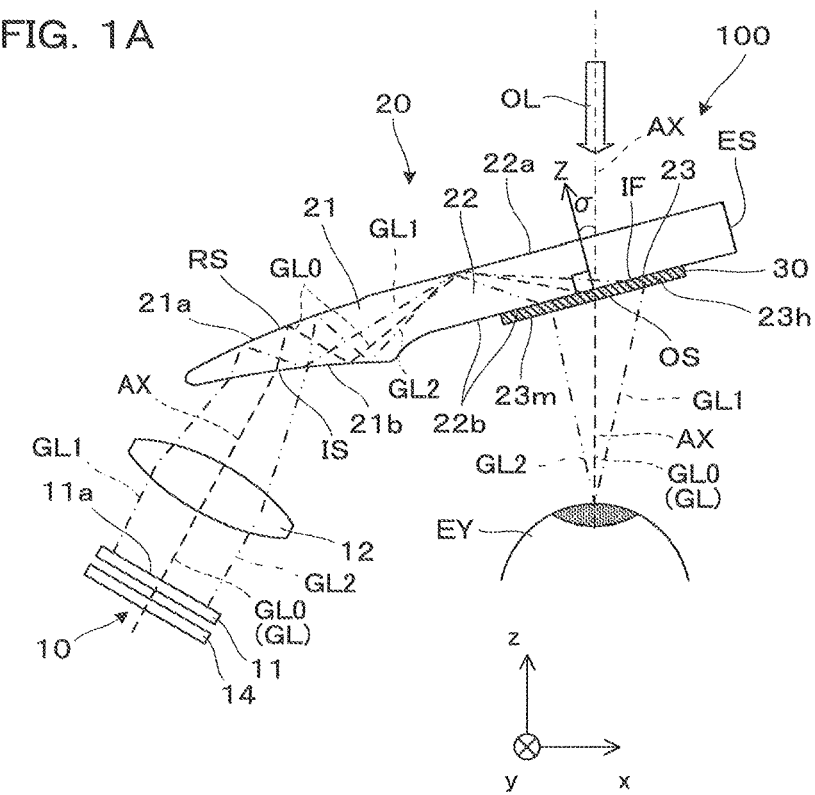
FIG. 1A is a sectional view showing a virtual-image display device according to a first embodiment.

A virtual-image display device incorporating a light guide device according to a first embodiment of the invention is explained below.

1A. Structures of the Light Guide Device and the Virtual-Image Display Device

The virtual-image display device incorporating the light guide device in the first embodiment is explained with reference to FIGS. 1A and 1B. A virtual-image display device 100 is applied to a head mounted display and includes an image forming device 10 and a light guide device 20 as a set. Note that FIG. 1A corresponds to an A-A cross section of the light guide device 20 shown in FIG. 1B.

The virtual-image display device 100 causes an observer to recognize a video serving as a virtual image and causes the observer to observe an external image in a see-through manner. In the virtual-image display device 100, one set of the image forming device 10 and the light guide device 20 is usually provided for each of the right eye and the left eye of the observer. However, since the image forming device 10 and the light guide device 20 for the right eye and the image forming device 10 and the light guide device 20 for the left eye are symmetrical, only the image forming device 10 and the light guide device 20 for the left eye are shown. Illustration is omitted concerning the image forming device 10 and the light guide device 20 for the right eye. Note that the virtual-image display device 100 as a whole has, for example, an external appearance (not shown in the figure) like general eyeglasses.

The image forming device 10 includes a liquid crystal device 11, which is a video element, and a projection lens 12 for optical coupling. The liquid crystal device (the video element) 11 spatially modulates illumination light from a light source 14 and forms video light GL that should be a display target such as a moving image. The liquid crystal device (the video element) 11 emits the video light GL having a predetermined polarization characteristic. Specifically, the video light GL in a state deviating to S polarized light can be made incident on a reflection unit 30 from the liquid crystal device 11 through a parallel light guide body 22. Note that the S polarized light is based on the reflection unit 30 and mirrors 31 of the reflection unit 30 explained in detail below. The projection lens 12 functions as, for example, a collimate lens that collimates the video light GL emitted from respective points on the liquid crystal device 11 concerning a longitudinal y direction into substantially parallel rays and functions as the collimate lens in cooperation with a part of the light guide device 20 concerning a lateral xz cross section. Note that the projection lens 12 is formed of glass or plastic. The projection lens 12 is not limited to one lens and can be a plurality of lenses. The projection lens 12 is not limited to a spherical lens and can be an aspherical lens, a free curved surface lens including an axially asymmetric curved surface, and the like.

The light guide device 20 includes a flat plate-like portion, emits the video light GL formed by the image forming device 10 toward an eye EY of the observer as virtual image light, and substantially directly transmits external light OL corresponding to the external image. The light guide device 20 includes an incident section 21 that captures video light, the parallel light guide body 22 for light guide, and an emitting section 23 for extracting the video light. In this embodiment, the incident section 21 is disposed on the ear side of the observer. The emitting section 23 is disposed on the nose side of the observer. The parallel light guide body 22 and a main body of the incident section 21 are an integrated component formed of a resin material having high light transmissivity. Note that the parallel light guide body 22 is disposed to be tilted with respect to an optical axis AX based on the eye EY of the observer. A normal direction Z of the parallel light guide body 22 is tilted by an angle σ with respect to the optical axis AX. In this case, the parallel light guide body 22 can be disposed along a curved line of the face of the observer. However, the normal of the parallel light guide body 22 has a tilt with respect to the optical axis AX. When the normal of the parallel light guide body 22 is tilted by the angle σ with respect to a z direction parallel to the optical axis AX in this way, video light GL0 on the optical axis AX and near the optical axis AX emitted from the reflection unit 30 forms the angle σ with respect to the normal of a light emission surface OS.

The incident section 21 includes a light incident surface IS that captures the video light GL from the image forming device 10 and a reflection surface RS that reflects the captured video light GL and guides the video light GL into the parallel light guide body 22. The light incident surface IS is formed from a curved surface 21*b* concave to the projection lens 12 side. The curved surface 21*b* has a function of totally reflecting, on the inner surface side, the video light GL reflected on the reflection surface RS. The reflection surface RS is formed from a curved surface 21*a* concave to the projection lens 12 side. The reflection surface RS is formed by applying film formation such as aluminum vapor deposition on the curved surface 21*a*. The reflection surface RS reflects the video light GL made incident from the light incident surface IS and refracts the video light GL in a predetermined direction. The curved surface 21*b* totally reflects, on the inner side, the video light GL reflected on the reflection surface RS and refracts optical paths in a predetermined direction. That is, the incident section 21 refracts the video light GL made incident from the light incident surface IS through the reflection performed twice to surely couple the video light GL in the parallel light guide body 22. Note that the curved surface 21*b* and the curved surface 21*a* are not limited to a spherical surface or an aspherical surface and can be an axial asymmetrical curved surface. Consequently, it is possible to improve optical performance of the light guide device 20. Further, the curved surfaces 21*b* and 21*a* may be curved surfaces having refractive power in the longitudinal y direction. Consequently, it is possible to supplement a collimate function by the projection lens 12.

The parallel light guide body 22 is a flat portion parallel to a y axis and inclined with respect to an x axis or a z axis and is referred to as light guide body as well. The parallel light guide body (the light guide body) 22 is formed of a light transmissive resin material or the like and includes two opposed planes 22*a* and 22*b*, which are a pair of surfaces extending in parallel. Since both the planes 22*a* and 22*b* are parallel planes, the planes 22*a* and 22*b* do not cause enlargement and focus shift concerning an external image. One plane 22*a* on a +z side or a Z side functions as a total reflection surface that totally reflects video light from the incident section 21 and has a role of guiding the video light to the emitting section 23 with a small loss. That is, the plane 22*a* on the +z side is disposed on the external environment side of the parallel light guide body 22 and functions as the total reflection surface. In this specification, the plane 22*a* is referred to as external environment side surface as well. In this specification, the plane 22*b* on a −z side is referred to as observer side surface as well. The plane (the observer side surface) 22*b* on the rear side extends to one end of the emitting section 23. An extended plane of the plane 22*b* on the rear side is an interface IF between the parallel light guide body 22 and the emitting section 23. In the parallel light guide body 22, the video light GL reflected on the inner side of the reflection surface RS and the light incident surface IS of the incident section 21 is made incident on the plane 22*a*, which is the total reflection surface, totally reflected on the plane 22*a*, and guided to the inner side of the light guide device 20, that is, a +x side or an X side where the emitting section 23 is provided. That is, in the parallel light guide body 22, an X-axis direction is a light guide direction of the video light GL. Note that the parallel light guide body 22 includes a terminal end surface ES as a side surface that defines an end face on the +x side or the X side in the external shape of the light guide device 20. The parallel light guide body 22 includes an upper end face TP and a lower end face BP as an upper surface and a bottom surface that define end faces on ±y sides.

Figure 2:
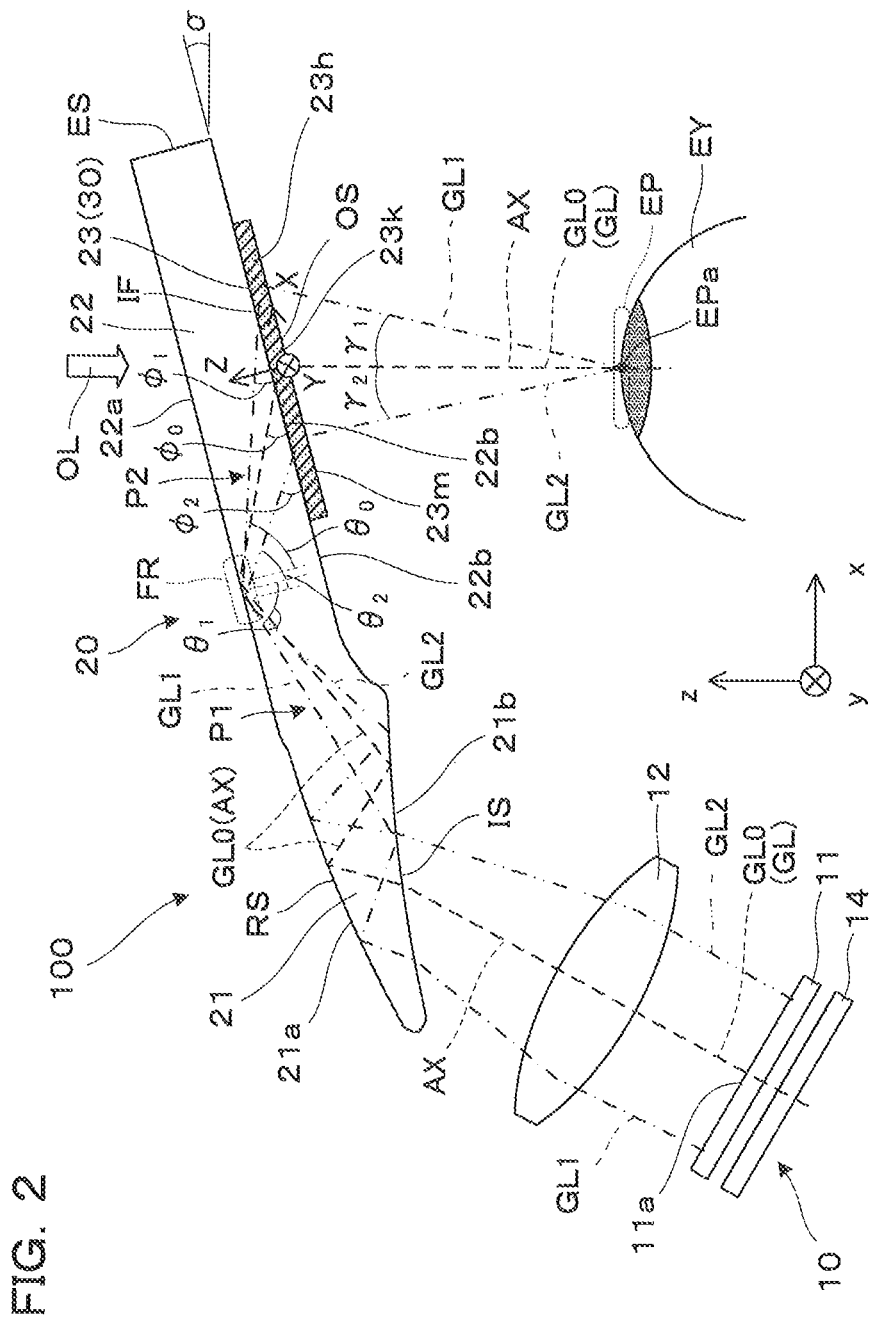
Figure 3:
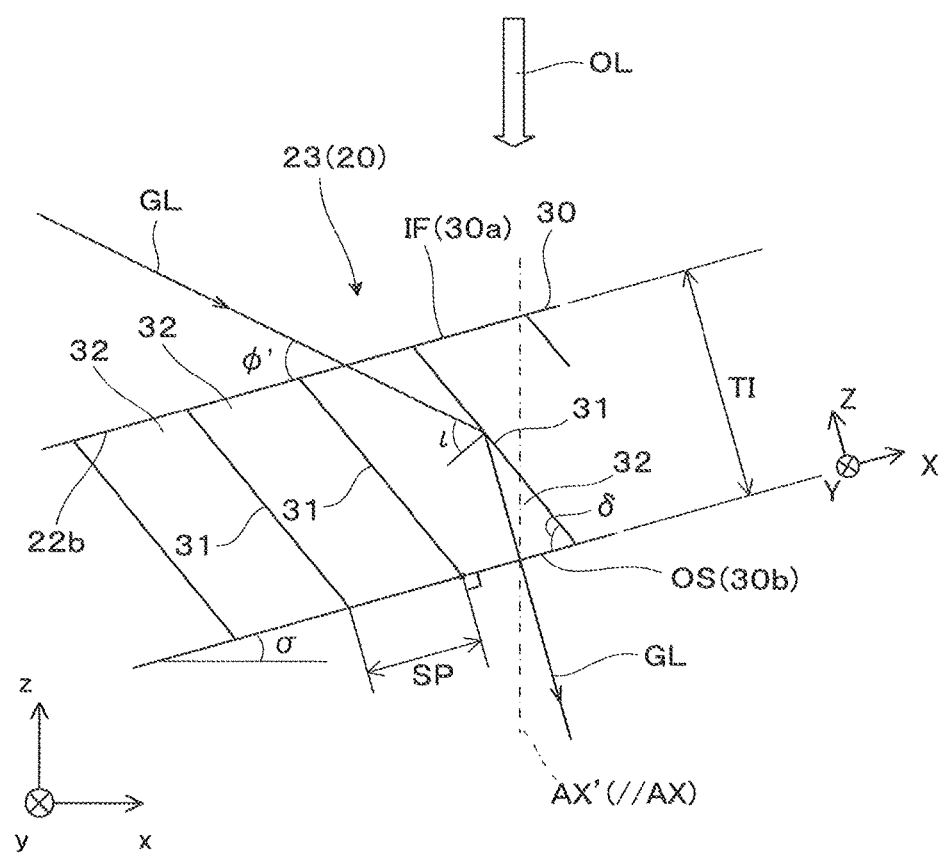
FIG. 3 is a partially enlarged view for explaining disposition of mirrors and a state of an optical path in a reflection unit.

As shown in FIG. 2, on the inner side (a +X side) of the parallel light guide body 22, the emitting section 23 is formed in a laminar shape on an extended line of the plane 22*b* on the rear side along the plane 22*b* or is formed in a laminar shape along the interface IF. When transmitting the video light GL totally reflected in a predetermined surface region FR in the plane (the total reflection surface) 22*a* on the external environment side of the parallel light guide body 22, the emitting section 23 reflects the incident video light GL at a predetermined angle and refracts the video light GL to the light emission surface OS side. The video light GL made incident on the emitting section 23 first without being transmitted through the emitting section 23 before is a target to be extracted as virtual image light. That is, even if there is light reflected on the inner surface of the light emission surface OS or the interface IF in the emitting section 23, the light is not used as video light. The emitting section 23 includes the reflection unit 30 formed by arraying a plurality of mirrors or the like having transmissivity. The detailed structure of the reflection unit 30 is explained in detail below with reference to FIG. 3 and the like.

Since the light guide device 20 has the structure explained above, the video light GL emitted from the image forming device 10 and made incident on the light guide device 20 from the light incident surface IS is refracted by reflection performed a plurality of times in the incident section 21, totally reflected in the predetermined surface region FR of the plane 22*a* of the parallel light guide body 22, and travels generally along the optical axis AX. The video light GL reflected in the predetermined surface region FR of the plane 22*a* on the +z side or a +Z side is made incident on the emitting section 23. At this point, in an XY plane, the width in the longitudinal direction of the predetermined surface region FR is narrower than the width in the longitudinal direction of the emitting section 23. That is, incident width of incidence of a bundle of rays of the video light GL on the emitting section 23 (or the reflection unit 30) is wider than incident width of incidence of the bundle of rays of the video light GL on the predetermined surface region FR. By setting the incident width of the incidence of the bundle of rays of the video light GL on the predetermined surface region FR relatively narrow in this way, interference of an optical path less easily occurs. It is easy to make the video light GL from the predetermined surface region FR directly incident on the emitting section 23 or the reflection unit 30 without using the interface IF for light guide (that is, without reflecting the video light GL on the interface IF). The video light GL made incident on the emitting section 23 is refracted at a proper angle in the emitting section 23 or the reflection unit 30 to be capable of being extracted. Finally, the video light GL is emitted from the light emission surface OS. The video light GL emitted from the light emission surface OS is made incident on the eye EY of the observer as virtual image light. When the virtual image light is focused on the retina of the observer, the observer can recognize the video light GL by a virtual image.

The angle of the incidence of the video light GL used for image formation on the emitting section 23 increases further away from the incident section 21 on the light source side. That is, on the inner side of the emitting section 23, the video light GL having a large tilt with respect a Z direction parallel to the plane 22a on the external environment side or with respect to the optical axis AX is made incident and refracted at a relatively large angle. On the front side of the emitting section 23, the video light GL having a small tilt with respect to the Z direction or the optical axis AX is made incident and refracted at a relatively small angle.

1B. Optical Paths of Video Lights

Optical paths of video lights are explained in detail below. As shown in FIG. 2, among video lights emitted from an emission surface 11a of the liquid crystal device 11, a component emitted from the center portion of the emission surface 11a indicated by a broken line is represented as video light GL0, a component emitted from the left side on the paper surface (a −x side closer to the +z) in the periphery of the emission surface 11a indicated by an alternate long and short dash line in the figure is represented as video light GL1, and a component emitted from the right side on the paper surface (the +x side closer to −z) in the periphery of the emission surface 11a indicated by an alternate long and two short dashes line in the figure is represented as video light GL2. Among the video lights, an optical path of the video light GL0 extends along the optical path AX.

Main components of the video lights GL0, GL1, and GL2 passed through the projection lens 12 are respectively made incident from the light incident surface IS of the light guide device 20. Thereafter, the main components reach the emitting section 23 passing the inside of the parallel light guide body 22 through the incident section 21.

Specifically, among the video lights GL0, GL1, and GL2, the video light GL0 emitted from the center portion of the emission surface 11a is refracted in the incident section 21 and coupled in the parallel light guide body 22. Thereafter, the video light GL0 is made incident on the predetermined surface region FR of one plane 22a and totally reflected at a standard reflection angle θ0, passes through the interface IF between the parallel light guide body 22 and the emitting section 23 (or the reflection unit 30) without being substantially reflected on the interface IF, and is directly made incident on a portion 23k in the center of the emitting section 23. The video light GL0 is reflected at a predetermined angle in the portion 23k and emitted from the light emission surface OS as parallel light beams in the optical axis AX direction (a direction at the angle σ with respect to the Z direction) tilted with respect to the XY plane including the light emission surface OS.

The video light GL1 emitted from one end side (the −x side) of the emission surface 11a is refracted in the incident section 21 and coupled in the parallel light guide body 22. Thereafter, the video light GL1 is made incident on the predetermined surface region FR of one plane 22a and totally reflected at a maximum reflection angle θ1, passes through the interface IF between the parallel light guide body 22 and the emitting section 23 (or the reflection unit 30) without being substantially reflected on the interface IF, and is reflected at a predetermined angle in a portion 23h on the inner side (the +X side) in the emitting section 23 and emitted as parallel light beams toward a predetermined angle direction from the light emission surface OS. At an emission angle (corresponding to an angle γ1 based on the optical axis AX) at this point, the video light GL1 is returned to the incident section 21 side at a relatively large degree.

On the other hand, the video light GL2 emitted from the other end side (the +x side) of the emission surface 11a is refracted by the incident section 21 and coupled in the parallel light guide body 22. Thereafter, the video light GL2 is made incident on the predetermined surface region FR of one plane 22a and totally reflected at a minimum reflection angle θ2, passes through the interface IF between the parallel light guide body 22 and the emitting section 23 (or the reflection unit 30) without being substantially reflected on the interface IF, and is reflected at a predetermined angle in a portion 23m on an inlet side (a −X side) in the emitting section 23 and emitted from the light emission surface OS as parallel light beams toward a predetermined angle direction. At an emission angle (corresponding to an angle γ2 based on the optical axis AX) at this point, the video light GL2 is returned to the incident section 21 side at a relatively small degree.

That is, the video lights GL0, GL1, and GL2 having various view angles gather at an eye point EPa assumed to be the eye EY of the observer. The eye point EPa means a position of an exit pupil set in the light guide device 20. If the eye EY is placed at the eye point EPa, a bright image without a defect can be obtained.

Note that the video lights GL0, GL1, and GL2 are explained representing a part of the entire ray of the video light GL. However, other ray components forming the video light GL are also guided and emitted from the light emission surface OS in the same manner as the video light GL0 and the like. Therefore, illustration and explanation are omitted concerning the ray components.

As an example of a value of a refractive index n of a transparent resin material used in the incident section 21 and the parallel light guide body 22, when n is set as n=1.4, a value of a critical angle θc of the transparent resin material is θc≡45.6°. By setting the reflection angle θ2, which is the smallest among the reflection angles θ0, θ1, and θ2 of the video lights GL0, GL1, and GL2, to a value larger than the critical angle θc, a total reflection condition on the plane 22a in the parallel light guide body 22 can be satisfied concerning necessary video light.

Note that the video light GL0 toward the center is made incident on the portion 23k of the emitting section 23 at an angle of elevation .phi.0 (=90.degree.−.theta.0). The video light GL1 toward the periphery is made incident on the portion 23h of the emitting section 23 at an angle of elevation .phi.1 (=90.degree.−.theta.1). The video light GL2 toward the periphery is made incident on the portion 23m of the emitting section 23 at an angle of elevation .phi.2 (=90.degree.−.theta.2). A relation of .phi.2>.phi.0>.phi.1 holds among the angles of elevation .phi.0, .phi.1, and .phi.2 reflecting a magnitude relation among the reflection angles .theta.0, .theta.1, and .theta.2. That is, an incident angle (see FIG. 3) on the mirrors 31 of a polarized light separation type of the reflection unit 30 gradually decreases in the order of the portion 23m corresponding to the angle of elevation .phi.2, the portion 23k corresponding to the angle of elevation .phi.0, and the portion 23h corresponding to the angle of elevation .phi.1. In other words, the incident angle on the mirrors 31 of the polarized light separation type or a reflection angle (when a reverse optical path is considered, an incident angle of a visual line) in the mirrors 31 decreases further away from the incident section 21. The incident angle on the mirrors 31 of the video lights GL0, GL1, and GL2 is set to 40.degree. or more from the viewpoint of making it possible to adjust the number of times of passage through the mirrors 31 to be small. Consequently, in a stage when the video light GL from the incident section 21 side is made incident on the reflection unit 30 and made incident on the first mirror 31 or a stage when the video light GL is made incident on the adjacent mirror 31, the video light GL is easily reflected by the mirror 31 and extracted to the eye EY side. That is, in the example in the embodiment, the mirrors 31 are configured to allow the video light GL to pass through twice at most. Consequently, it is easy to perform luminance control of the video light GL via the reflection unit 30. It is possible to perform display at high image quality.

An overall behavior of the bundle of beams of the video light GL reflected on the plane 22a on the external environment side of the parallel light guide body 22 and traveling to the emitting section 23 is explained. In a cross section including the optical axis AX, the width of the bundle of beams of the video light GL is narrowed in one of straight forward optical paths P1 and P2 before and after reflection on the predetermined surface region FR on the external environment side of the parallel light guide body 22. Specifically, in an XZ cross section including the optical axis AX, the width of the bundle of beams of the video light GL is narrowed as a whole in a position across both the straight forward optical paths P1 and P2 near the predetermined surface region FR, that is, near the boundary between the straight forward optical paths P1 and P2 and the beam width decreases. Consequently, the bundle of beams of the video light GL is narrowed before the emitting section 23. It is easy to set an angular field of view in the lateral direction relatively wide.

Note that, in the example shown in the figure, the width of the bundle of beams of the video light GL is narrowed in the position across both the straight forward optical paths P1 and P2 and the beam width decreases. However, it is also possible that the width is narrowed only on one side of the straight forward optical paths P1 and P2 and the beam width decreases.

1C. Structure of the Emitting Section and Refraction of an Optical Path by the Emitting Section The structure of the emitting section 23 and refraction of an optical path of video light by the emitting section 23 are explained in detail below with reference to FIGS. 2 to 3 and the like.

First, the structure of the emitting section 23 is explained. The emitting section 23 includes the reflection unit 30 formed by arraying the plurality of mirrors 31 of the polarized light separation type that respectively partially reflect the video light GL. The reflection unit 30 is a rectangular plate-like member extending along the XY plane tilted by the angle σ with respect to the optical axis AX. The reflection unit 30 has structure in which a large number of thin belt-like mirrors 31 are embedded to form stripe patterns. That is, the reflection unit 30 is configured by arraying a large number of elongated mirrors 31, which extend in the y direction or a Y direction, in a direction in which the parallel light guide body 22 extends, that is, an X direction. Spaces among the mirrors 31 are filled with an isotropic refraction medium. More specifically, the mirrors 31 extend linearly with the longitudinal direction set in a direction extending in parallel to the planes 22a and 22b of the parallel light guide body 22 shown in FIG. 2 and the like and perpendicularly to the X direction in which the mirrors 31 are arrayed, that is, the vertical y direction or Y direction. Further, the mirrors 31 incline to the incident section 21 side further toward the external environment side than the observer side of the parallel light guide body 22. More specifically, the mirrors 31 are inclined such that the upper end (the +Z side) rotates counterclockwise with the longitudinal direction (the Y direction) set as an axis and on the basis of a YZ plane orthogonal to the planes 22a and 22b. That is, the mirrors 31 extend in a direction between a −X direction and a +Z direction when viewed in the XZ cross section. Further, all the mirrors 31 are precisely disposed in parallel to one another. In this case, the video light GL can pass through only the mirrors 31 in a position where the video light GL is made incident on the emitting section 23 or near the position without being reflected on the interface IF between the parallel light guide body 22 and the reflection unit 30. Consequently, it is possible to reduce the number of times the video light GL, which should be observed, passes through the mirrors 31 and prevent luminance unevenness and dimming. On the other hand, it is possible to prevent unintended emission of video light and suppress occurrence of ghost light.

The reflection unit 30 has structure in which a large number of block members 32 having an isotropic refractive index are joined. The mirror 31 is a thin film-like mirror sandwiched between a pair of block members 32 adjacent to each other. The refractive index of the block members 32 is substantially equal to the refractive index of the parallel light guide body 22. However, the refractive indexes of the block members 32 and the parallel light guide body 22 can be differentiated. When the refractive indexes of the block members 32 and the parallel light guide body 22 are differentiated, it is necessary to adjust or correct an angle δ of the inclination of the mirrors 31.

The mirrors 31 are reflection elements formed of, for example, dielectric multilayer films. The reflectance of P polarized light and the reflectance of S polarized light are different in the mirrors 31. Since the mirrors 31 are the dielectric multilayer films, it is easy to adjust the reflectance of the P polarized light and the reflectance of the S polarized light. Further, it is possible to reduce a loss of light. Even if the reflectance is reduced, it is easy to maintain uniform characteristics. The P polarized light means light, an electric field component of which is parallel to the incident surfaces of the mirrors 31 (that is, an XZ plane perpendicular to the mirrors 31 and including an incident ray and a reflected ray). The S polarized light means light, an electric field component of which is perpendicular to the incident surfaces of the mirrors 31.

More specifically, the plurality of mirrors 31 are reflection elements having the same characteristics and having the reflectance of the P polarized light lower than the reflectance of the S polarized light. For example, when the reflectance of the P polarized light of the mirrors 31 is represented as Rp and the reflectance of the S polarized light of the mirrors 31 is represented as Rs, a reflection characteristic of the mirrors 31 is set such that the following conditional expressions (1) and (2) are satisfied.

$$Rp<0.05 \qquad (1)$$

$$Rp<0.5\times Rs \qquad (2)$$

In this case, a difference between the reflectance of the P polarized light and the reflectance of the S polarized light is large and the reflectance of the P polarized light is considerably small. Therefore, while increasing the transmittance of the external light OL, it is possible to suppress occurrence of a ghost when a near object is viewed. Further, in a specific example, the reflection characteristic of the mirrors 31 satisfies the following conditional expression (2)' instead of the conditional expression (2)

$$Rp<0.2\times Rs \qquad (2)'$$

That is, the reflectance of the P polarized light is set extremely low. The reflectance of the S polarized light is set twice or more, desirably, five times or more as large as the reflectance of the P polarized light and is relatively sufficiently large. Note that the overall reflectance for the video light GL of the mirrors 31, that is, combined reflectance of the P polarized light and the S polarized light is set to 3% or more and 50% or less in an assumed incident angle range of the video light GL from the viewpoint of facilitating see-through observation of the external light OL.

Thickness T1 of the reflection unit 30 (that is, the width in the Z-axis direction of the mirrors 31) is set to approximately 0.7 mm to 3.0 mm. Note that the thickness of the parallel light guide body 22 that supports the reflection unit 30 is, for example, approximately several mm to 10 mm, desirably, approximately 4 mm to 6 mm. If the thickness of the parallel light guide body 22 is sufficiently large compared with the thickness of the reflection unit 30, it is possible to reduce an incident angle of the video light GL on the reflection unit 30 or the interface IF. It is easy to suppress reflection on the mirrors 31 present in a position where the video light GL is not captured by the eye EY. On the other hand, if the thickness of the parallel light guide body 22 is set relatively small, it is easy to achieve a reduction in the weight of the parallel light guide body 22 and the light guide device 20.

All the mirrors 31 are set to the same tilt. The mirrors 31 can form the inclination angle δ of, for example, approximately 48° to 70° clockwise on the basis of the plane 22b on the observer side of the parallel light guide body 22. Specifically, the mirrors 31 forms the inclination angle δ of, for example, 60°. It is assumed that the angle of elevation φ0 of the video light GL0 is set to, for example, 30°, the angle of elevation φ1 of the video light GL1 is set to, for example 22°, and the angle of elevation φ2 of the video light GL2 is set to, for example, 38°. In this case, the video light GL1 and the video light GL2 are made incident on the eye EY of the observer at an angle γ1=γ2≡12.5° on the basis of the optical axis AX.

Consequently, when a component (the video light GL1) having a relatively large total reflection angle in the video light GL is made incident mainly on the portion 23h side on the +X side, which is a counter-incident side, in the reflection unit 30, and a component (the video light GL2) having a relatively small total reflection angle is made incident mainly on the portion 23m side on the −X side, which is an incident side, in the emitting section 23, it is possible to efficiently extract the video light GL in an angle state for collecting the video light GL in the eye EY of the observer as a whole. Since the video light GL is extracted in such an angle relation, the light guide device 20 can reflect the video light GL once in the reflection unit 30 in principle without transmitting the video light GL a plurality of times. It is possible to extract the video light GL as virtual image light with a small loss.

Note that, it is likely that unused light passing through the mirrors 31 of the reflection unit 30 once or more times is made incident on the plane 22a on the external environment side again. However, when the unused light is totally reflected, most of the unused light can be made incident on the portion 23h on the inner side of the reflection unit 30 or further on the inner side and outside an effective region. The likelihood of the incidence on the eye EY is reduced.

In the portions 23m, 23k, and 23h of the reflection unit 30, at least a part of the video light GL passes through the mirrors 31 a plurality of times (specifically, is transmitted once or more and reflected once). In this case, although the video light GL passes through the mirror 31 a plurality of times, since reflected lights from the plurality of mirrors 31 are balanced to a certain degree and respectively made incident on the eye EY of the observer as the video light GL, a loss of a light amount is not very large. On the other hand, when the video light GL passes through the mirrors 31 three or more times, light amount control for the video light GL is difficult. It is likely that vertical streak-like unevenness is observed in a visible image. Therefore, an array interval SP of the mirrors 31 and thickness TI of the reflection unit 30 are set as appropriate.

Functions of the plurality of mirrors 31 configuring the reflection unit 30 are explained with reference to FIGS. 4 and 5 and the like. Note that, in the following explanation, to simplify the explanation, basically, the external light OL is made perpendicularly incident on the principal plane of the reflection unit 30 and perpendicularly emitted from the light emission surface OS. Accordingly, in FIG. 4, the external light OL is made incident on the reflection unit 30 from a perpendicular direction. FIG. 5 corresponds to a state shown in FIG. 4. In FIG. 5, the video light GL is made incident on the reflection unit 30 at an angle of elevation φ and emitted from the reflection unit 30 in the perpendicular direction.

The mirrors 31 are polarized light separation elements formed of dielectric multilayer films. The P polarized light indicated by a solid line is transmitted at transmittance α and the S polarized light indicated by a dotted light is transmitted at transmittance β. That is, the reflectance of the P polarized light of the mirrors 31 is Rp=(1−α). The reflectance of the S polarized light of the mirrors 31 is Rs=(1−β). For convenience, the mirror 31 on which the video light GL from the incident section 21 side is made incident first when being made incident on the reflection unit 30 is referred to as first mirror 31A. The adjacent mirror 31 disposed on the counter-incident side of the first mirror 31A is referred to as second mirror 31B.

Figure 4:
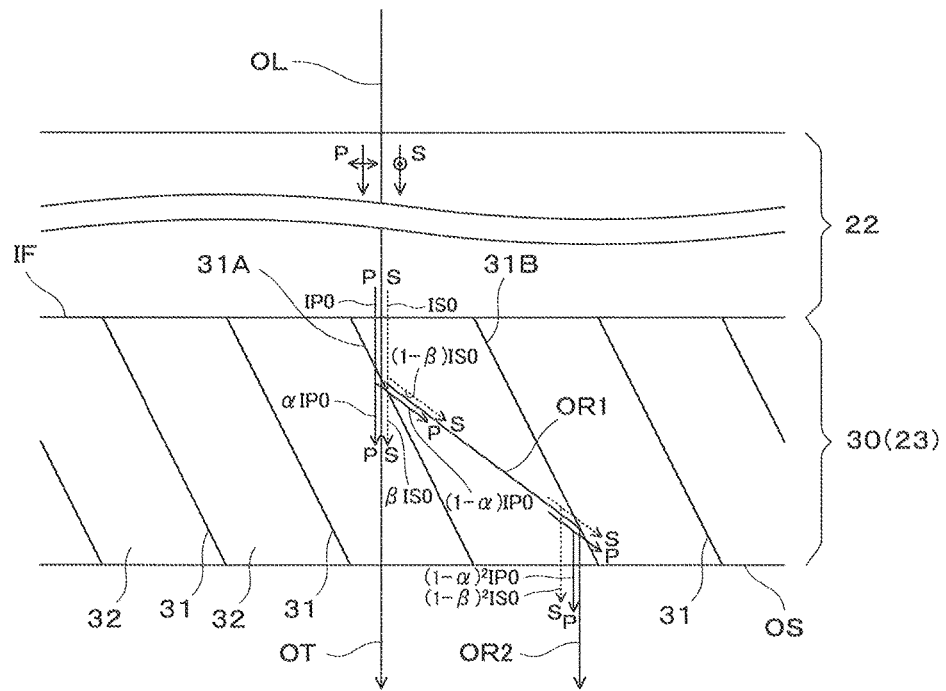
FIG. 4 is a diagram for explaining processing of external light by the reflection unit.
Figure 5:
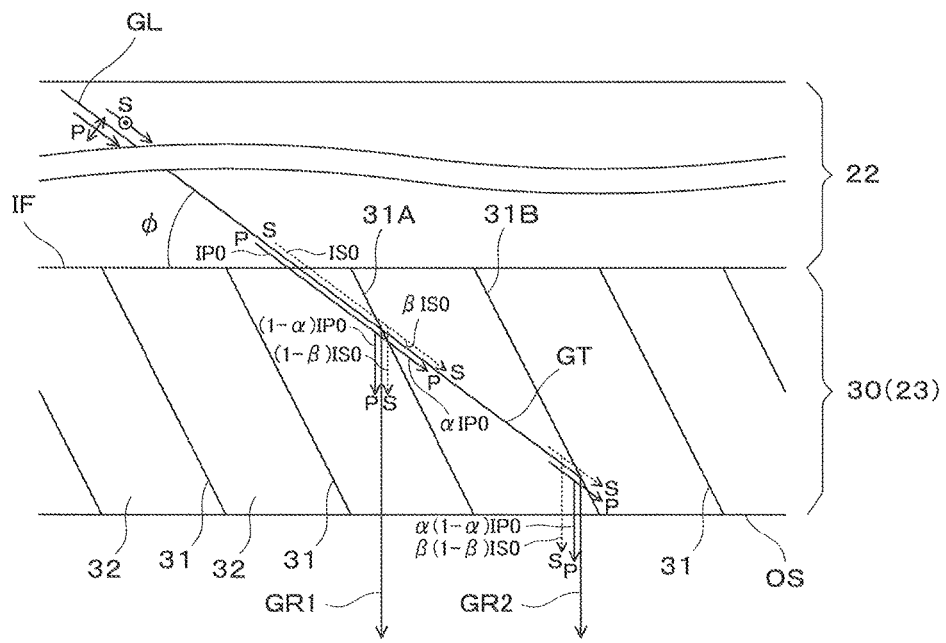
FIG. 5 is a diagram for explaining processing of video light by the reflection unit.

As shown in FIG. 4, when the external light OL made incident on the reflection unit 30 includes a P polarized light component and an S polarized light component, the respective polarized light components are separated for distinction of transmission and reflection of the polarized light component by the first mirror 31A. Specifically, when the original intensity of the P polarized light component is represented as IP0 and the original intensity of the S polarized light component is represented as IS0, transmitted light OT of the first mirror 31A includes P polarized light having intensity α×IP0 and S polarized light having intensity β×IS0. Reflected light OR1 of the first mirror 31A includes P polarized light having intensity (1−α)×IP0 and S polarized light having intensity (1−β)×IS0. Polarized light components of the reflected light OR1 from the first mirror 31A are separated for distinction of transmission and reflection of the polarized light component by the second mirror 31B. Specifically, reflected light OR2 of the second mirror 31B includes P polarized light having intensity $(1-\alpha)^2 \times IP0$ and S polarized light having intensity $(1-\beta)^2 \times IS0$. That is, the transmitted light OT having intensity (α×IP0+β×IS0) passed through the first mirror 31A and the reflected light OR2 having intensity $((1-\alpha)^2 \times IP0 + (1-\beta))^2 \times IS0)$ passed through the second mirror 31B are made incident on the eye EY of the observer through the reflection unit 30.

The reflectance Rp=(1−α) of the P polarized light of the mirrors 31 is approximately zero. The intensity of the transmitted light OT from the first mirror 31A is α×IP0+β×IS0. The intensity of the reflected light OR2 from the second mirror 31B is $(1-\beta)^2 \times IS0$. Further, when most of polarized light components included in the external light OL are P polarized light components, that is, when the intensity IS0<<the intensity IP0, the intensity of the transmitted light OT from the first mirror 31A is approximately α×IP0. The intensity of the reflected light OR2 from the second mirror 31B is substantially zero. As a result, the external light OL made incident on the eye EY of the observer is only light transmitted through the first mirror 31A. Light passed through the second mirror 31B is substantially absent. Note that it is not rare that a polarized light component included in the external light OL deviates to a P polarized light component. For example, this occurs when reflected light is observed or when a display of a specific type is observed.

When the external light OL reaching the eye EY is formed by only the light transmitted through the first mirror 31A, when a near object is viewed through the reflection unit 30, it is possible to suppress a ghost from being observed because of the reflected light OR2 (that is, indirect light due to double reflection on the mirrors 31). Since the external light OL from the near object has an angle of divergence, when the transmitted light OT and the reflected light OR2 passing through the first mirror 31A and the second mirror 31B, which are different in positions and extend in parallel, and made incident on the eye EY at the same angle coexist, this causes a ghost in which images are slightly shifted and superimposed. Note that, when an infinite object is viewed through the reflection unit 30, the ghost in which the images are slightly shifted and superimposed in this way does not occur.

On the other hand, as shown in FIG. 5, when the video light GL made incident on the reflection unit 30 includes a P polarized light component and the S polarized light component, the respective polarized light components are separated for distinction of transmission and reflection of the polarized light component by the first mirror 31A. Specifically, when the original intensity of the P polarized light component is represented as IP0 and the original intensity of the S polarized light component is represented as IS0, reflected light GR1 of the first mirror 31A includes P polarized light having intensity (1−α)×IP0 and S polarized light having intensity (1−β)×IS0. Transmitted light GT of the first mirror 31A includes P polarized light having intensity α×IP0 and S polarized light having intensity β×IS0. Polarized light components of the transmitted light GT from the first mirror 31A are separated for distinction of transmission and reflection of the polarized light component by the second mirror 31B. Specifically, reflected light GR2 of the second mirror 31B includes P polarized light having intensity α(1−α)×IP0 and S polarized light having intensity β(1−β)×IS0. That is, the reflected light GR1 having intensity ((1−α)×IP0+(1−β)×IS0) passed through the first mirror 31A and the reflected light GR2 having intensity (α(1−α)×IP0+β(1−β)×IS0) passed through the second mirror 31B are made incident on the eye EY of the observer through the reflection unit 30.

The reflectance Rp=(1−α) of the P polarized light of the mirrors 31 is approximately zero. The intensity of the reflected light GR1 from the first mirror 31A is (1−β)×IS0. The intensity of the reflected light GR2 from the second mirror 31B is β(1−β)×IS0. Note that, when most of polarized light components included in the video light GL are S polarized light components, that is, when the intensity IP0<<the intensity IS0, no particular problem occurs even if the reflectance Rp=(1−α) of the P polarized light is approximately zero. This is rather desirable from the viewpoint that a transmission loss of the P polarized light component is eliminated.

Figure 6:
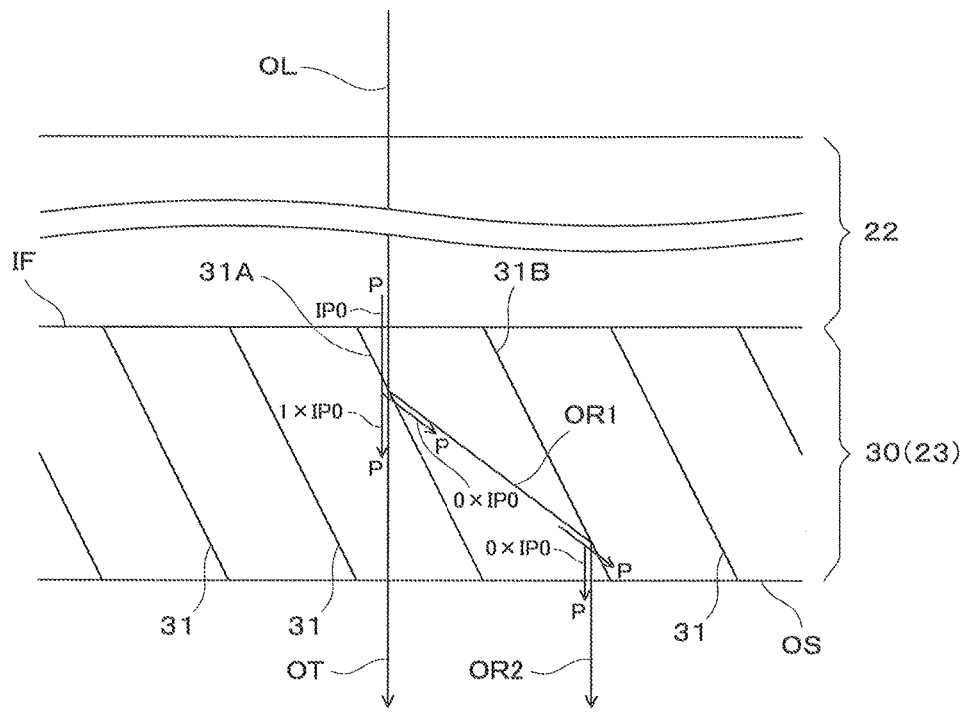
FIG. 6 is a diagram for explaining an example of the processing of the external light by the reflection unit.
Figure 7:
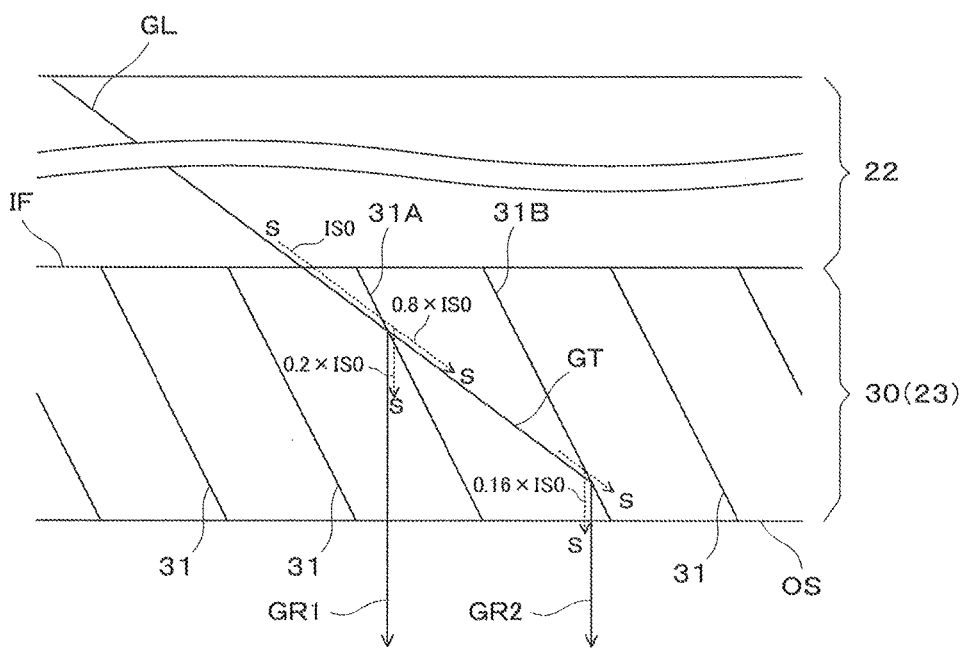
FIG. 7 is a diagram for explaining an example of the processing of the video light by the reflection unit.

FIGS. 6 and 7 are diagrams for explaining functions of specific configuration examples of the plurality of mirrors 31 configuring the reflection unit 30. In this case, the mirrors 31 transmit P polarized light indicated by a solid line at transmittance α=1.0 and transmits S polarized light indicated by a dotted line at transmittance β=0.8.

As it is evident from FIG. 6, when most of the external light OL made incident on the reflection unit 30 is P polarized light, the intensity of the transmitted light OT passing straight through the first mirror 31A and traveling toward the eye EY is 0.8×IP0. The intensity of the reflected light OR2 refracted by the second mirror 31B and traveling to the eye EY is zero. That is, irrespective of whether the external light OL is light from the infinity or light from a near object, it is possible to prevent occurrence of a ghost in which images are slightly shifted and superimposed. As it is evident from FIG. 7, when the video light GL made incident on the reflection unit 30 is S polarized light, the intensity of the transmitted light GT refracted by the first mirror 31A and traveling toward the eye EY is 0.2×IS0. The intensity of the reflected light GR2 refracted by the second mirror 31B and traveling toward the eye EY is 0.16×IS0. The video light GL made incident on the reflection unit 30 is formed by parallel light as a ray substantially from the infinity. If only angle information is maintained in the reflection unit 30, even if an emitting position shifts, a ghost in which images are slightly shifted and superimposed does not occur.

In the above explanation, for convenience of explanation, it is assumed that the external light OL is made perpendicularly incident on the principal plane of the reflection unit 30. However, the same functions can be exhibited even if the external light OL is made obliquely incident on the principal plane of the reflection unit 30. For example, a polarized light separation characteristic of the plurality of mirrors 31 configuring the reflection unit 30 only has to be adjusted as appropriate according to incident angles of the external light OL and the video light GL. Even when there is predetermined width in the incident angles, it is possible to uniformly keep the reflectances of the P polarized light and the S polarized light in a degree for not causing a problem. Further, in the above explanation, wavelengths of the external light OL and the video light GL are not explained. However, the external light OL and the video light GL can be set to any wavelengths in a wavelength region of a visible ray. Even when there is predetermined width in the wavelength region of light in this way, it is possible to uniformly keep the reflectances of the P polarized light and the S polarized light in a degree for not causing a problem.

Figure 8:
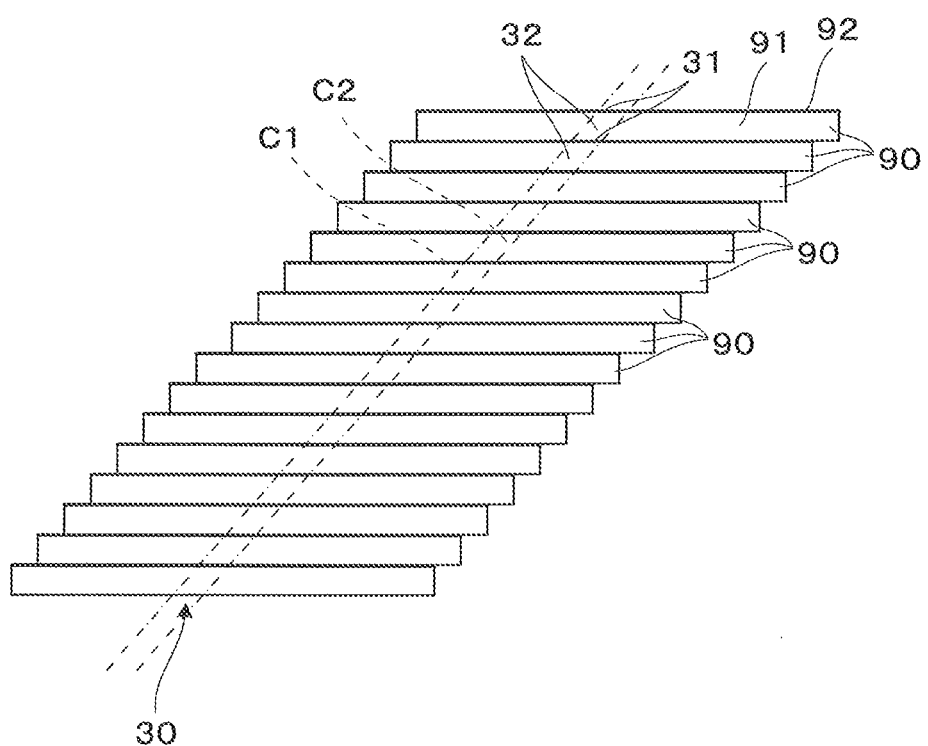
FIG. 8 is a diagram for explaining a manufacturing example of the reflection unit.

An example of a manufacturing method for the reflection unit 30 is explained with reference to FIG. 8. A large number of glass plates 91, which are parallel flat plates made of glass, are prepared in advance. Subsequently, a large number of element plates 90 are prepared by forming dielectric multilayer films 92 on surfaces of the prepared large number of glass plates 91 using vacuum evaporation or the like. In order to realize a desired polarized light separation characteristic, a film material, film thickness, the number of stacked layers, and the like of the dielectric multilayer films 92 are set as appropriate. Thereafter, the formed large number of element plates 90 are stacked while being joined by an adhesive. The entire element plates 90 are obliquely cut along cutting lines C1 and C2. Consequently, it is possible to obtain the reflection unit 30 having structure in which the mirrors 31 formed by the dielectric multilayer films are sandwiched among the block members 32, which are elongated prism pieces obtained by obliquely dividing the parallel flat plates. The reflection unit 30 is stuck to an appropriate place on the observer side of the parallel light guide body 22 via an adhesive and fixed by hardening the adhesive.

1D. Overview of the First Embodiment

In the light guide device 20 in the first embodiment explained above, the plurality of mirrors 31 configuring the reflection unit 30 are the reflection elements having the reflectance of the P polarized light lower than the reflectance of the S polarized light. Therefore, for example, when the external light OL deviating to the P polarized light is made incident on the light guide device 20, it is possible to reduce the external light OL reflected on the first mirror 31A, reflected again on the adjacent second mirror 31B, and made incident on the eye EY with respect to the external light OL made incident on the reflection unit 30, passed through the specific first mirror 31A, and is made incident on the eye EY. Consequently, when a near object is viewed through the parallel light guide body 22, it is possible to suppress a ghost from being observed because of indirect lights due to double reflection in the mirrors 31. When the video light GL deviating to the S polarized light is made incident on the reflection unit 30 through the parallel light guide body 22, it is possible to suppress a luminance decrease of the video light GL made incident on the reflection unit 30, reflected on the specific first mirror 31A, and made incident on the eye EY. It is possible to improve light use efficiency of the video light GL.

Figure 9:
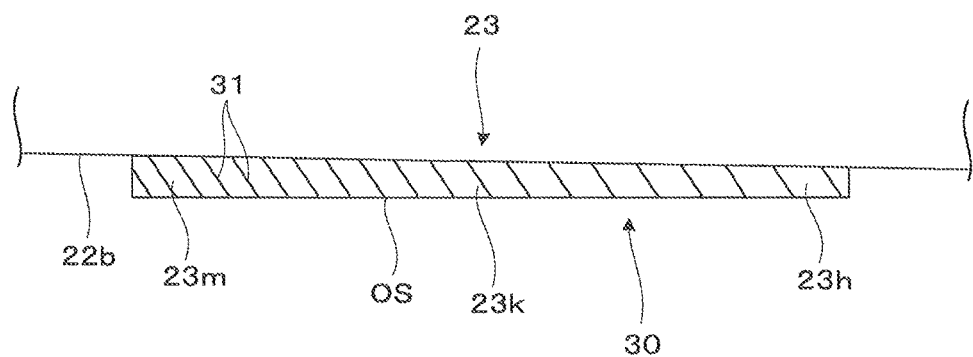
FIG. 9 is a sectional view for explaining a modification on an emission side of optical paths of video lights.

FIG. 9 is a diagram for explaining a modification concerning the structure and the like of the emitting section 23 in the light guide device 20 according to the first embodiment. In this case, the reflection unit 30 is thick on the incident side close to the incident section 21 and thin on the counter-incident side far from the incident section 21. The array interval SP of the mirrors 31 configuring the reflection unit 30 is short on the incident side close to the incident section 21 and gradually becomes long on the counter-incident side far from the incident section 21.

In the light guide device 20, the angle of elevation ϕ2 of the video light GL2 is small on a far side from the incident section 21. By reducing the reflection unit 30 in thickness and widening the array interval SP, it is possible to suppress the number of times the video light GL2 passes through the mirror 31 from increasing. The light emission surface OS on the observation side of the reflection unit 30 and the plane 22a on the external environment side of the parallel light guide body 22 are desirably parallel. That is, a portion adjacent to the reflection unit 30 in the parallel light guide body 22 has a slight wedge angle in principle.

Figure 10:
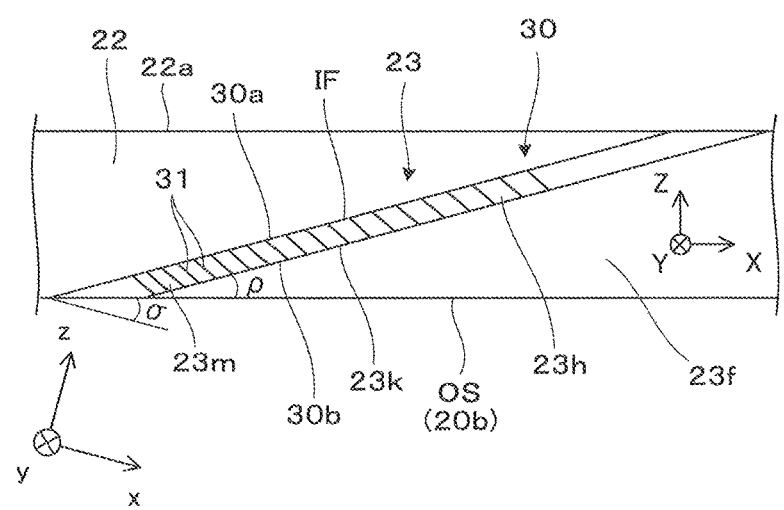
FIG. 10 is a sectional view for explaining another modification on the emission side of the optical paths of the video lights.

FIG. 10 is a diagram for explaining another modification concerning the structure and the like of the emitting section 23 in the light guide device 20 according to the first embodiment. In this case, the reflection unit 30 provided in the emitting section 23 is incorporated in an inclined state. Specifically, the reflection unit 30 is inclined such that the portion 23h on the inner side far from the incident section 21 is closer to the external environment than the portion 23m on the front side close to the incident section 21. That is, an incident surface 30a and an emission surface 30b of the reflection unit 30 are inclined at an appropriate angle ρ smaller than 90° counterclockwise on the basis of the planes 22a and 22b of the parallel light guide body 22.

Note that the emitting section 23 includes, on the opposite side of the parallel light guide body 22 across the reflection unit 30, a prism member 23f wedge-shaped in section joined to the emission surface 30b of the reflection unit 30. Consequently, the plane 22a on the external environment side of the parallel light guide body 22 and the light emission surface OS or the plane 20b opposed to the plane 22a are parallel. Natural observation of the external light OL can be performed. Even if the reflection unit 30 is disposed in the inclined state, if an angle condition is set the same as the angle condition in the example shown in FIGS. 2 and 3, it is possible to reflect, on the plurality of mirrors 31, the video light GL reflected on the plane 22a on the external environment side of the parallel light guide body 22 and cause the video light GL to pass through the light emission surface OS on the observation side. It is possible to form a virtual image in the same manner as shown in FIG. 2 and the like.

Second Embodiment

A virtual-image display device incorporating a light guide device according to a second embodiment of the invention is explained. Note that the light guide device according to the second embodiment is obtained by partially changing the light guide device according to the first embodiment. Explanation is omitted concerning the common portions.

Figure 11:
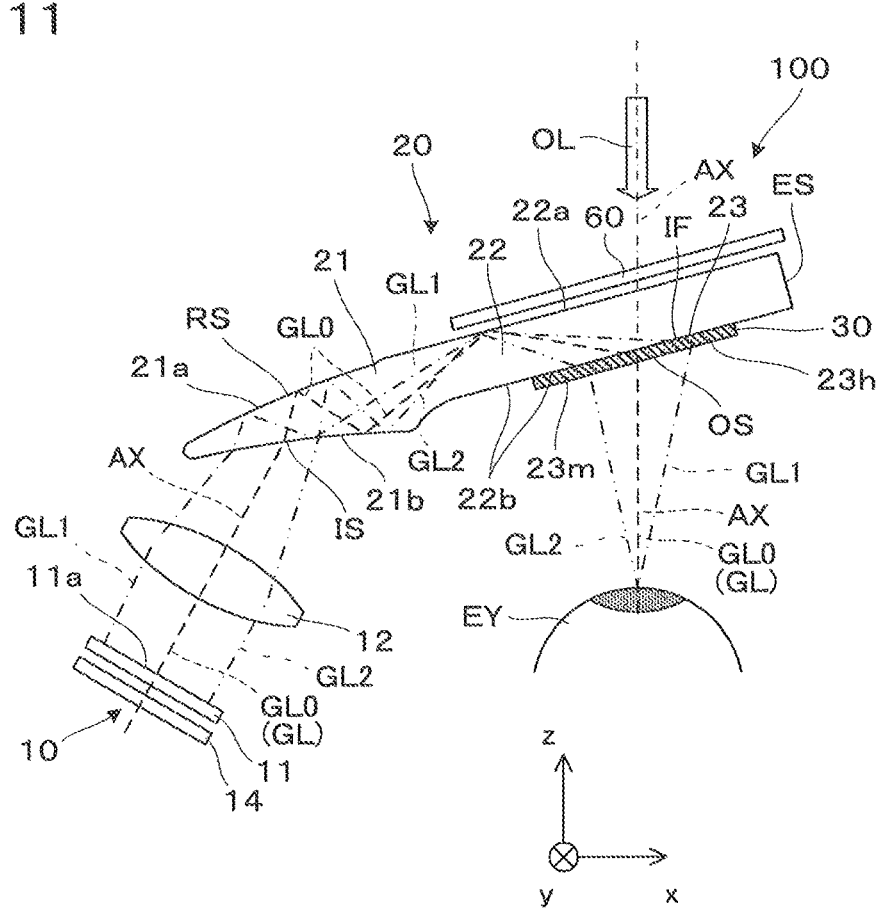
FIG. 11 is a diagram for explaining a virtual-image display device according to a second embodiment.

As shown in FIG. 11, the virtual-image display device 100 in this embodiment includes, as an element incidental to the light guide device 20, a shade member 60 that covers the external environment side of the light guide device 20. The shade member 60 is detachably fixed to the light guide device 20 via a not-shown frame. The shade member 60 has a polarization characteristic deviating to a predetermined direction. Specifically, the transmittance of P polarized light is higher than the transmittance of S polarized light. Consequently, the external light OL deviating to the P polarized light can be made incident on the light guide device 20 and the reflection unit 30. Therefore, it is possible to surely suppress occurrence of a ghost when a near object is viewed. Note that, concerning the polarization characteristic of the shade member 60, the P polarized light and the S polarized light are based on the mirrors 31 of the light guide device 20. That is, in the shade member 60, the transmittance of the P polarized light, which is an electric field component in a first direction (equivalent to the x-axis direction in FIG. 11) substantially parallel to the light guide direction of the parallel light guide body 22 (that is, the X-axis direction), in the external light OL is higher than the transmittance of the S polarized light, which is an electric field component in a second direction (equivalent to the y-axis direction in FIG. 11) orthogonal to the first direction, in the external light OL.

Others

The invention is explained above according to the embodiments. However, the invention is not limited to the embodiments and can be carried out in various forms in a range not departing from the spirit of the invention. For example, modifications explained below are also possible.

For example, the light guide device 20 provided in the virtual-image display device 100 in the embodiments totally reflects, in the parallel light guide body 22, the video light GL on the plane 22a only once and guides the video light GL to the reflection unit 30. However, the light guide device 20 can also totally reflect the video light GL on the opposed planes 22a and 22b a plurality of times and guide the video light GL to the reflection unit 30. For example, after the reflection on the plane 22b, the light guide device 20 can reflect the video light GL on the plane 22a and guide the video light GL to the reflection unit 30. Further, the light guide device 20 can reflect the video light GL three or more times with the planes 22a and 22b and guide the video light GL to the reflection unit 30. However, in this case, it is necessary to finally reflect the video light GL on the plane 22a on the front side and guide the video light GL to the reflection unit 30. Besides, concerning the number of times of the total reflection performed until the video light GL reaches the emitting section 23, it is not essential to set the number of times of the total reflection the same in all the video lights GL. It is possible to combine the video lights GL having different numbers of times of reflection on the planes 22a and 22b to display an image.

The reflectances of the large number of mirrors 31 provided in the reflection unit 30 are set the same in principle. However, the reflectance or the polarized light separation characteristic of the mirrors 31 can also be gradually changed from the incident side close to the incident section 21 to the counter-incident side.

In the above explanation, the transmissive liquid crystal device 11 is used as the video element. However, the video element is not limited to the transmissive liquid crystal device. Various devices can be used as the video element. For example, a reflective liquid crystal panel can also be used. A digital micro-mirror device and the like can also be used instead of the liquid crystal device 11. Self-emitting elements represented by an organic EL, an LED array, and an organic LED can also be used. Further, a laser scanner obtained by combining a laser beam source and a scanner such as a polygon mirror can also be used.

Figure 12:
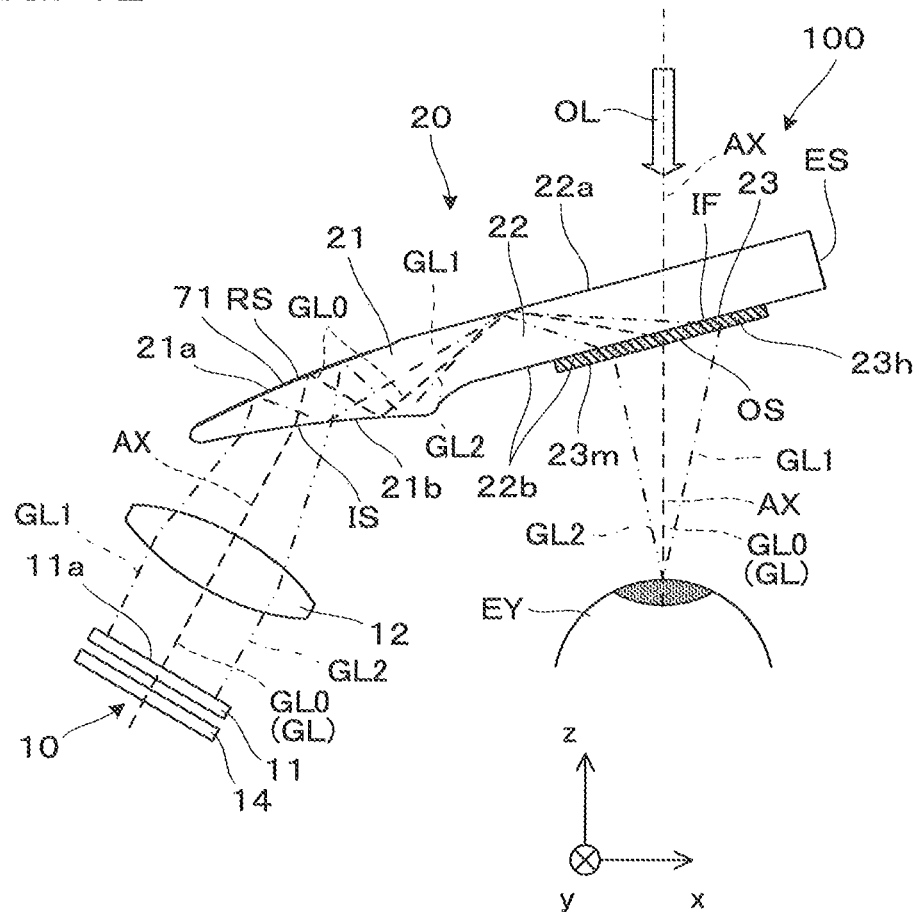
FIG. 12 is a sectional view for explaining a modification of a light guide device.

For example, as shown in FIG. 12, a polarization element 71 can be disposed on the optical path of the video light GL in the light guide device 20. The polarization element 71 also functions as the reflection surface RS of the incident section 21 and is an optical element that gives a polarization characteristic deviating to a predetermined direction. For example, the polarization element 71 is obtained by coating the rear surface of a reflective polarization filter or a transmissive polarization filter, which is formed of, for example, an organic material or an inorganic material, with a mirror. By incorporating such a polarization element 71, when the liquid crystal device 11 emits polarized light as the video light GL, it is possible to improve deviation concerning the polarized light of the video light GL. Specifically, the video light GL made incident on the reflection unit 30 can be limited to the S polarized light. For example, the video light GL deviating to the S polarized light can be made incident on the reflection unit 30. Therefore, it is possible to suppress a luminance decrease of video light made incident on the reflection unit 30, reflected on the specific mirror 31, and made incident on the eye EY. It is possible to improve light use efficiency of the video light GL. Even when a device that emits the video light GL not having a polarization characteristic is used as the video element instead of the liquid crystal device 11, a role for aligning a polarization direction of the video light GL in a specific direction can be imparted to the device. For example, the video light GL deviating to the S polarized light can be made incident on the reflection unit 30. Therefore, it is possible to improve the light use efficiency of the video light GL.

In the above explanation, in the virtual-image display device 100, one set of the image forming device 10 and the light guide device 20 is provided for each of the right eye and the left eye. However, the image forming device 10 and the light guide device 20 may be provided for only one of the left eye and the right eye to view an image with one eye.

In the above specific explanation, it is assumed that the virtual-image display device 100 in this embodiment is the head mounted display. However, the virtual-image display device 100 in the embodiment can also be applied to a head-up display, a binocular type hand-held display, and the like.

In the above explanation, in the planes 22a and 22b of the parallel light guide body 22 or the like or the curved surface 21b, the video light is totally reflected and guided by the interface with the air without providing a mirror, a half mirror, or the like on the surface. However, the total reflection in the invention includes reflection achieved by forming a mirror coat or a half mirror film in the entire or a part of the planes 22a and 22b. For example, the total reflection includes, after an incident angle of the video light GL satisfies a total reflection condition, applying a mirror coat or the like in a part of the planes 22a and 22b and reflecting substantially the entire video light.

In the above explanation, the parallel light guide body 22 is formed laterally long in the X direction or an x direction and the light incident surface IS is formed to be located on the lateral direction outer side of the eye. However, the position of the light incident surface IS is not limited to this as long as the video light GL can be appropriately guided into the light guide device 20. The light incident surface IS can also be provided in, for example, a part of the upper end face TP or the lower end face BP present above or below the light guide device 20. In this case, the reflection unit 30 is rotated 90° around the optical axis AX in front of the eye.

Note that, when the shade member 60 is added to the light guide device 20 changed in the direction in this way, in the shade member 60, the transmittance of the P polarized light, which is the electric field component in the first direction (that is, the longitudinal direction) substantially parallel to the light guide direction of the parallel light guide body 22, in the external light OL is higher than the transmittance of the S polarized light, which is the electric field component in the second direction (that is, the lateral direction) orthogonal to the first direction, in the external light OL.

Although not explained above, the upper end face TP, the lower end face BP, and the like in the outer circumferential section defining the external shape in the parallel light guide body 22 can be formed as black paint applied surfaces or sandblast machined surfaces. Further, black paint application or sandblast machining may be applied to places other than the upper end face TP and the lower end face BP. The black paint application or the sandblast machining may be applied to only a part of the upper end face TP, the lower end face BP, and the like.

Third Embodiment

A virtual-image display device incorporating a light guide device according to a third embodiment of the invention is explained below. Note that the light guide device according to the third embodiment is obtained by partially changing the light guide device according to the first embodiment. Explanation is omitted concerning the common portions.

Figure 1B:
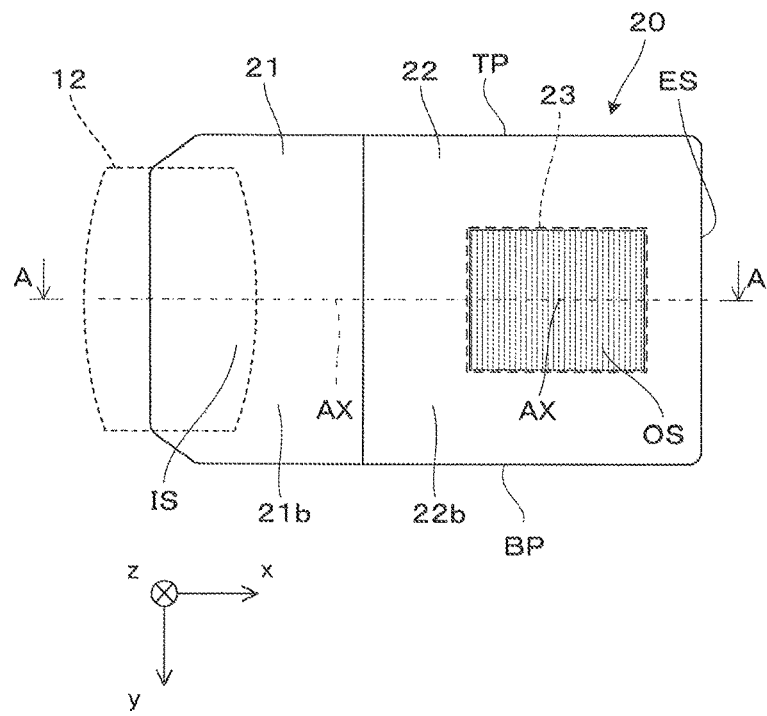
FIG. 1B is a rear view of a light guide device.

The structures of the light guide device and the virtual-image display device in the third embodiment are basically the same as the structures of the light guide device and the virtual-image display device in the first embodiment shown in FIGS. 1A, 1B, and 2. The reference to FIGS. 1A, 1B, and 2 is directly applied to the light guide device in the third embodiment.

An optical path of video light in the light guide device and the virtual-image display device in the third embodiment is the same as the optical path of the video light in the light guide device and the virtual-image display device in the first embodiment shown in FIGS. 1A, 1B, and 2 except the optical path in the reflection unit 30 provided in the emitting section 23.

The structure of the emitting section 23 and refraction of an optical path of video light and switching of a polarization state by the emitting section 23 are explained in detail below with reference to FIGS. 2 and 13 and the like.

First, the structure of the emitting section 23 is explained. The emitting section 23 includes the reflection unit 30 formed by arraying composite layers 39 obtained by combining the plurality of mirrors 31 of the polarized light separation type that respectively partially reflect the video light GL and wavelength plates 35 for polarization state conversion that respectively change a polarization state of the video light GL. The reflection unit 30 is a rectangular plate-like member extending along the XY plane tiled by the angle σ with respect to the optical axis AX. The reflection unit 30 has structure in which a large number of the composite layers 39, which are obtained by combining the thin belt-like mirrors 31 and the wavelength plates 35, are embedded to form stripe patterns. That is, the reflection unit 30 is configured by arraying a large number of elongated composite layers 39, which extend in the y direction or the Y direction, in a direction in which the parallel light guide body 22 extends, that is, the X direction. More specifically, the mirrors 31 and the wavelength plates 35 extend linearly with the longitudinal direction set in a direction extending in parallel to the planes 22a and 22b of the parallel light guide body 22 shown in FIG. 2 and the like and perpendicularly to the X direction in which the mirrors 31 are arrayed, that is, the vertical y direction or Y direction. Further, the mirrors 31 and the wavelength plates 35 incline to the incident section 21 side further toward the external environment side than the observer side of the parallel light guide body 22. More specifically, the mirrors 31 are inclined such that the upper end (the +Z side) rotates counterclockwise with the longitudinal direction (the Y direction) set as an axis and on the basis of the YZ plane orthogonal to the planes 22a and 22b. That is, the mirrors 31 and the wavelength plates 35 extend in a direction between the –X direction and the +Z direction when viewed in the XZ cross section. Further, all the mirrors 31 and all the wavelength plates 35 are disposed precisely in parallel to one another. In the composite layers 39 explained above, the mirrors 31 are disposed on the incident side and the wavelength plates 35 are disposed on the counter-incident side. That is, the wavelength plates 35 are disposed on the counter-incident side of the mirrors 31.

The reflection unit 30 has structure in which a large number of block members 32 are joined. The composite layer 39 obtained by combining the mirror 31 and the wavelength plate 35 is a thin film-like layer sandwiched between a pair of block members 32 adjacent to each other. The refractive index of the block members 32 is substantially equal to the refractive index of the parallel light guide body 22. However, the refractive indexes of the block members 32 and the parallel light guide body 22 can be differentiated. When the refractive indexes of the block members 32 and the parallel light guide body 22 are differentiated, it is necessary to adjust or correct the angle δ of the inclination of the mirrors 31.

The mirrors 31 are reflection elements formed of, for example, dielectric multilayer films. The reflectance of P polarized light and the reflectance of S polarized light are different in the mirrors 31. More specifically, the plurality of mirrors 31 are reflection elements having the same characteristics and having the reflectance of the P polarized light lower than the reflectance of the S polarized light. For example, when the reflectance of the P polarized light of the mirrors 31 is represented as Rp and the reflectance of the S polarized light of the mirrors 31 is represented as Rs, a reflection characteristic of the mirrors 31 is set such that the following conditional expressions (1) and (2) are satisfied.

$$Rp<0.05 \tag{1}$$

$$Rp<0.5\times Rs \tag{2}$$

Further, in a specific example, the reflection characteristic of the mirrors 31 satisfies the following conditional expression (2)' instead of the conditional expression (2).

$$Rp<0.2\times Rs \tag{2}'$$

That is, the reflectance of the P polarized light is set extremely low. The reflectance of the S polarized light is set twice or more, desirably, five times or more as large as the reflectance of the P polarized light and is relatively sufficiently large. Note that the overall reflectance of the mirrors 31 for the video light GL, that is, combined reflectance of the P polarized light and the S polarized light is set to 3% or more and 50% or less in an assumed incident angle range of the video light GL from the viewpoint of facilitating see-through observation of the external light OL.

The wavelength plates 35 are, for example, half wavelength plates formed by micro structure layers in which evaporated films of a dielectric, films of an organic material, and stripe-like nano-structures are formed. The wavelength plates 35 switch polarization states of the video light GL and the external light OL made incident on the mirrors 31. Specifically, for example, when the video light GL of the P polarized light passes through the mirrors 31, the wavelength plates 35 switch the P polarized light to the S polarized light. When the video light GL of the S polarized light passes through the mirrors 31, the wavelength plates 35 switch the S polarized light to the P polarized light. For example, before the external light OL of the P polarized light is made incident on the mirrors 31, the wavelength plates 35 switch the P polarized light to the S polarized light. Before the external light OL of the S polarized light is made incident on the mirrors 31, the wavelength plates 35 switch the S polarized light to the P polarized light. To realize such switching of a polarization direction, reference axes such as optical axes of the wavelength plates 35 are set as appropriate on the basis of a direction in which the wavelength plates 35 or the mirrors 31 extend.

Note that an angle of the video light GL made incident on the mirrors 31 and an angle of the external light OL made incident on the mirrors 31 are angles on the opposite sides and coincide with each other. Therefore, the wavelength plates 35 exert the same action on the video light GL and the external light OL.

The thickness TI of the reflection unit 30 (that is, the width in the Z-axis direction of the mirrors 31) is set to approximately 0.7 mm to 3.0 mm. Note that the thickness of the parallel light guide body 22 that supports the reflection unit 30 is, for example, approximately several mm to 10 mm, desirably, approximately 4 mm to 6 mm. When the thickness of the parallel light guide body 22 is sufficiently large compared with the thickness of the reflection unit 30, it is easy to reduce an incident angle of the video light GL on the reflection unit 30 or the interface IF. It is easy to suppress reflection on the mirrors 31 present in a position where the video light GL is not captured into the eye EY. On the other hand, when the thickness of the parallel light guide body 22 is set relatively thin, it is easy to achieve a reduction in the weight of the parallel light guide body 22 and the light guide device 20. Note that the thickness of the wavelength plates 35 is desirably set sufficiently small compared with the array interval SP of the mirrors 31. Consequently, it is possible to prevent the video light GL not made incident on the mirrors 31 from interfering with the wavelength plates 35.

All of the mirrors 31 and the wavelength plates 35 are set to the same tilt and can form the inclination angle δ of, for example, approximately 48° to 70° clockwise on the basis of the plane 22b on the observer side of the parallel light guide body 22. Specifically, the mirrors 31 forms the inclination angle δ of, for example, 60° with respect to the plane 22b. It is assumed that the angle of elevation φ0 of the video light GL0 is set to, for example, 30°, the angle of elevation φ0 of the video light GL1 is set to, for example 220, and the angle of elevation φ2 of the video light GL2 is set to, for example, 38°. In this case, the video light GL1 and the video light GL2 are made incident on the eye EY of the observer at an angle γ1=γ2≡12.5° on the basis of the optical axis AX.

Consequently, when a component (the video light GL1) having a relatively large total reflection angle in the video light GL is made incident mainly on the portion 23h side on the +X side, which is the counter-incident side, in the reflection unit 30, and a component (the video light GL2) having a relatively small total reflection angle is made incident mainly on the portion 23m side on the −X side, which is the incident side, in the emitting section 23, it is possible to efficiently extract the video light GL in an angle state for collecting the video light GL in the eye EY of the observer as a whole. Since the video light GL is extracted in such an angle relation, the light guide device 20 can reflect the video light GL once in the reflection unit 30 in principle without transmitting the video light GL a plurality of times. It is possible to extract the video light GL as virtual image light with a small loss.

Note that it is likely that unused light passing through the mirrors 31 of the reflection unit 30 once or more times is made incident on the plane 22a on the external environment side again. However, when the unused light is totally reflected, most of the unused light can be made incident on the portion 23h on the inner side of the reflection unit 30 or further on the inner side and outside an effective region. The likelihood of the incidence on the eye EY is reduced.

In the portions 23m, 23k, and 23h of the reflection unit 30, at least a part of the video light GL passes through the mirrors 31 a plurality of times (specifically, is transmitted once or more and reflected once). In this case, although the video light GL passes through the mirror 31 a plurality of times, as explained below, since reflected lights from the plurality of mirrors 31 are balanced and respectively made incident on the eye EY of the observer as the video light GL, it is possible to suppress vertical streak-like unevenness from being observed in a visible image. On the other hand, when the video light GL passes through the mirrors 31 three or more times, light amount control for the video light GL is difficult. It is likely that vertical streak-like unevenness is observed in a visible image. Therefore, the array interval SP of the mirrors 31 and the thickness TI of the reflection unit 30 are set as appropriate.

Figure 14:
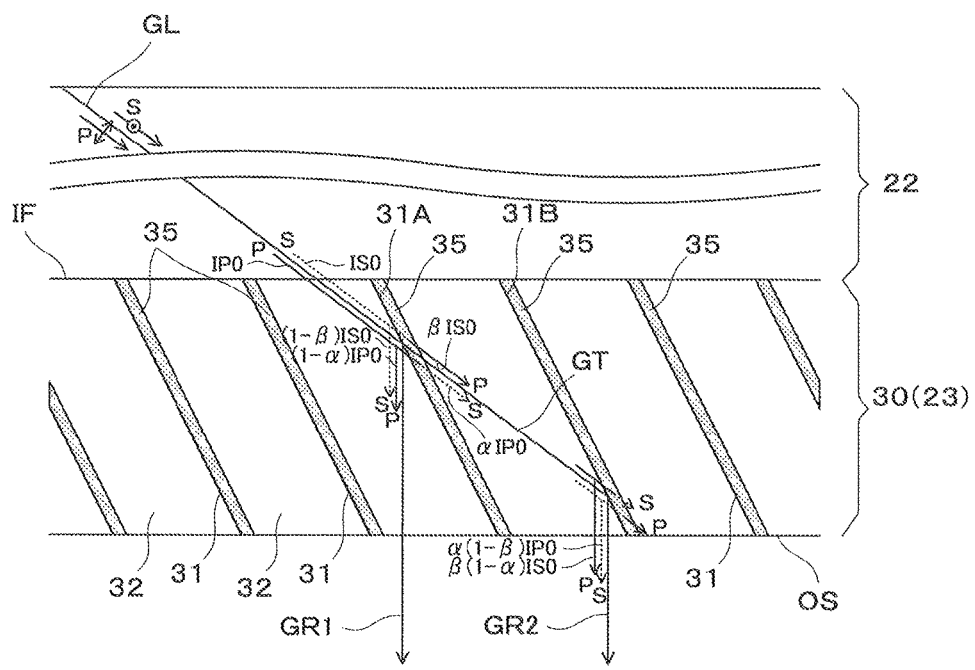
FIG. 14 is a diagram for explaining processing of video light by the reflection unit.

Functions of the plurality of mirrors 31 and the plurality of wavelength plates 35 configuring the reflection unit 30 are explained with reference to FIGS. 14 and 15 and the like. Note that, in the following explanation, to simplify the explanation, basically, the external light OL is made perpendicularly incident on the principal plane of the reflection unit 30 and perpendicularly emitted from the light emission surface OS. Accordingly, in FIG. 15, the external light OL is made incident on the reflection unit 30 from a perpendicular direction. FIG. 14 corresponds to a state shown in FIG. 15. In FIG. 14, the video light GL is made incident on the reflection unit 30 at the angle of elevation φ and emitted from the reflection unit 30 in the perpendicular direction.

The mirrors 31 are polarized light separation elements formed of dielectric multilayer films. The P polarized light indicated by a solid line is transmitted at the transmittance α and the S polarized light indicated by a dotted light is transmitted at the transmittance β. That is, the reflectance of the P polarized light of the mirrors 31 is Rp=(1−α). The reflectance of the S polarized light of the mirrors 31 is Rs=(1−β). For convenience, the mirror 31 on which the video light GL from the incident section 21 side is made incident first when being made incident on the reflection unit 30 is referred to as first mirror 31A. The adjacent mirror 31 disposed on the counter-incident side of the first mirror 31A is referred to as second mirror 31B.

The wavelength plate 35 is disposed adjacent to the first mirror 31A on the counter-incident side of the first mirror 31A. As explained above, the wavelength plate 35 converts the video light GL after the passage through the mirror 31 from the S polarized light into the P polarized light or from the P polarized light into the S polarized light. The wavelength plate 35 converts the external light OL before the incidence on the mirror 31 from the S polarized light into the P polarized light or from the P polarized light into the S polarized light.

As shown in FIG. 14, when the video light GL made incident on the reflection unit 30 includes a P polarized light component and an S polarized light component, the polarized light components are separated for distinction of transmission and reflection of the polarized light component by the first mirror 31A. Specifically, when the original intensity of the P polarized light component is represented as IP0 and the original intensity of the S polarized light component is represented as IS0, the reflected light GR1 of the first mirror 31A includes P polarized light having intensity $(1-\alpha) \times IP0$ and S polarized light having intensity $(1-\beta) \times IS0$. The transmitted light GT of the first mirror 31A includes S polarized light having intensity $\alpha \times IP0$ and P polarized light having intensity $\beta \times IS0$. Since the video light GL passes through the wavelength plate 35 as well according to the passage through the first mirror 31A, the S polarized light and the P polarized light are interchanged. Polarized light components of the transmitted light GT from the first mirror 31A are separated for distinction of transmission and reflection of the polarized light component by the second mirror 31B. Specifically, the reflected light GR2 of the second mirror 31B includes P polarized light having intensity $\beta(1-\alpha) \times IS0$ and S polarized light having intensity $\alpha(1-\beta) \times IP0$. That is, the reflected light GR1 having intensity $((1-\alpha) \times IP0 + (1-\beta) \times$ IS0) passed through the first mirror 31A and the reflected light GR2 having intensity ($\beta(1-\alpha) \times IS0 + \alpha(1-\beta) \times IP0$) passed through the second mirror 31B are made incident on the eye EY of the observer through the reflection unit 30.

The reflectance $Rp=(1-\alpha)$ of the P polarized light of the mirrors 31 is approximately zero. The intensity of the reflected light GR1 from the first mirror 31A is $(1-\beta) \times IS0$. The intensity of the reflected light GR2 from the second mirror 31B is $\alpha(1-\beta) \times IP0$. Transmittance $Rs=\alpha$ of the P polarized light is approximately a value close to 1. If the video light GL substantially equally includes the P polarized light and the S polarized light, the intensity $(1-\beta) \times IS0$ of the reflected light GR1 from the first mirror 31A and the intensity $\alpha(1-\beta) \times IP0 \equiv (1-\beta) \times IP0$ of the reflected light GR2 from the second mirror 31B are considered to be substantially equal.

As explained above, when the intensity of the reflected light GR1 from the first mirror 31A and the intensity of the reflected light GR2 from the second mirror 31B are equal, video lights respectively reflected as S polarized lights on the specific mirror 31A and the adjacent mirror 31B are substantially equally extracted to the eye side. That is, the luminance of the reflected light GR1 or the video light GL reflected on the first mirror 31A and made incident on the eye EY and the luminance of the reflected light GR2 or the video light GL reflected on the second mirror 31B and made incident on the eye EY can be balanced. It is possible to suppress vertical streak-like unevenness from being observed in a visible image. That is, the video lights GL emitted from respective display points on the liquid crystal device 11 are made incident around the eye point EPa, where the eye EY is disposed, in a relatively uniform luminance distribution with less relationship with the disposition of the mirrors 31. Therefore, compared with when the reflected light GR1 from the first mirror 31A and the reflected light GR2 from the second mirror 31B are not balanced, it is possible to prevent unintended vertical streak-like unevenness from being observed in a virtual image seen through the reflection unit 30.

Figure 15:
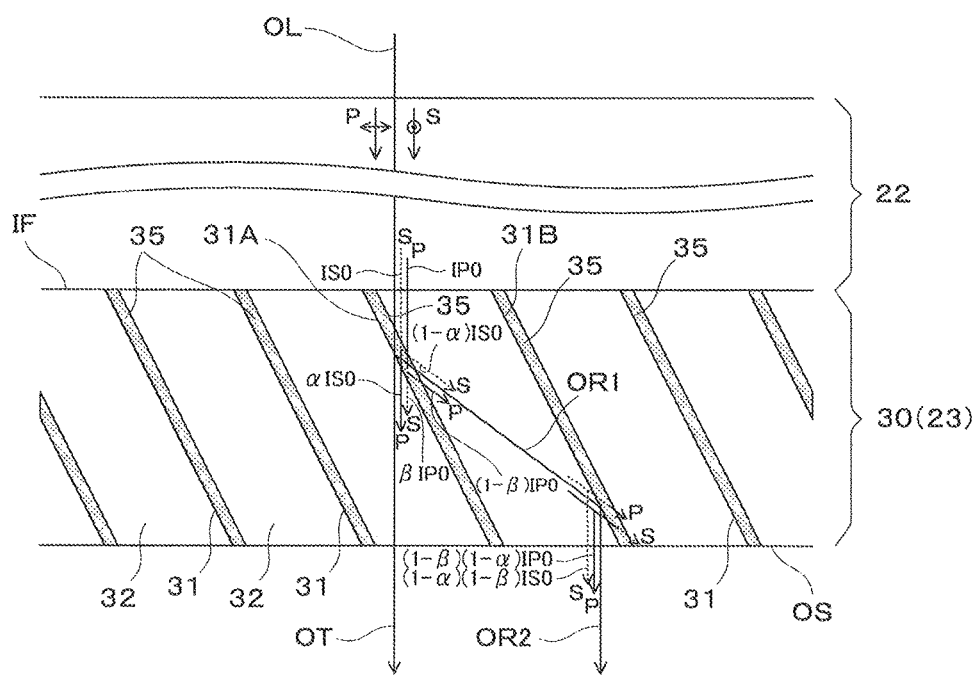
FIG. 15 is a diagram for explaining processing of external light by the reflection unit.

On the other hand, as shown in FIG. 15, when the external light OL made incident on the reflection unit 30 includes a P polarized light component and an S polarized light component, the polarized light components are separated for distinction of transmission and reflection of the polarized light component by the first mirror 31A. Specifically, when the original intensity of the P polarized light component is represented as IP0 and the original intensity of the S polarized light component is represented as IS0, the transmitted light OT of the first mirror 31A includes P polarized light having intensity $\alpha \times IS0$ and S polarized light having intensity $\beta \times IS0$. The reflected light OR1 of the first mirror 31A includes P polarized light having intensity $(1-\beta) \times IP0$ and S polarized light having intensity $(1-\alpha) \times IS0$. Polarized light components of the reflected light OR1 from the first mirror 31A are separated for distinction of transmission and reflection of the polarized light component by the second mirror 31B. Specifically, the reflected light OR2 of the second mirror 31B includes P polarized light having intensity $(1-\beta) \cdot (1-\alpha) \times IP0$ and S polarized light having intensity $(1-\alpha) \cdot (1-\beta) \times IS0$. That is, the transmitted light OT having intensity ($\alpha \times IS0 + \beta \times IP0$) passed through the first mirror 31A and the reflected light OR2 having intensity ($(1-\beta) \cdot (1-\alpha) \times IP0 + (1-\alpha) \cdot (1-\beta) \times IS0$) passed through the second mirror 31B are made incident on the eye EY of the observer through the reflection unit 30.

The reflectance $Rp=(1-\alpha)$ of the P polarized light of the mirrors 31 is approximately zero. The intensity of the transmitted light OT from the first mirror 31A is $\alpha \times IS0 + \beta \times IP0$. The intensity of the reflected light OR2 from the second mirror 31B is $0 \times IS0 + 0 \times IP0$. As a result, the external light OL made incident on the eye EY of the observer is only the external light OL transmitted through the first mirror 31A. The external light OL passed through the second mirror 31B is substantially absent. When the external light OL reaching the eye EY is formed by only the external light OL transmitted through the first mirror 31A, when a near object is viewed through the reflection unit 30, it is possible to suppress a ghost from being observed because of the reflected light OR2 (that is, indirect light due to double reflection on the mirrors 31). Since the external light OL from the near object has an angle of divergence, when the transmitted light OT and the reflected light OR2 passing through the first mirror 31A and the second mirror 31B, which are different in positions and extend in parallel, and made incident on the eye EY at the same angle coexist, this causes a ghost in which images are slightly shifted and superimposed. Note that, when an infinite object is viewed through the reflection unit 30, the ghost in which the images are slightly shifted and superimposed in this way does not occur.

Figure 16:
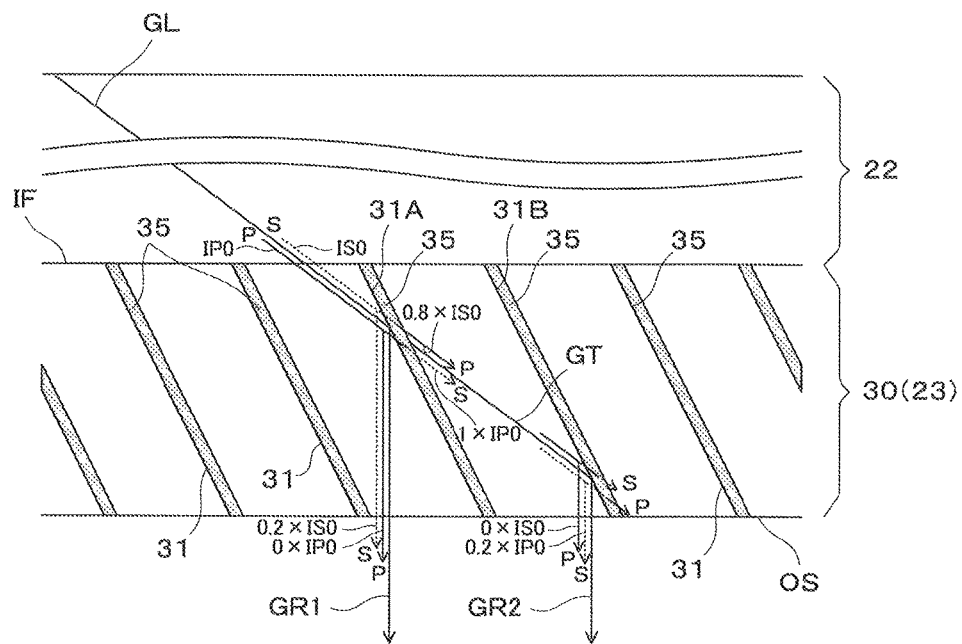
FIG. 16 is a diagram for explaining an example of the processing of the video light by the reflection unit.
Figure 17:
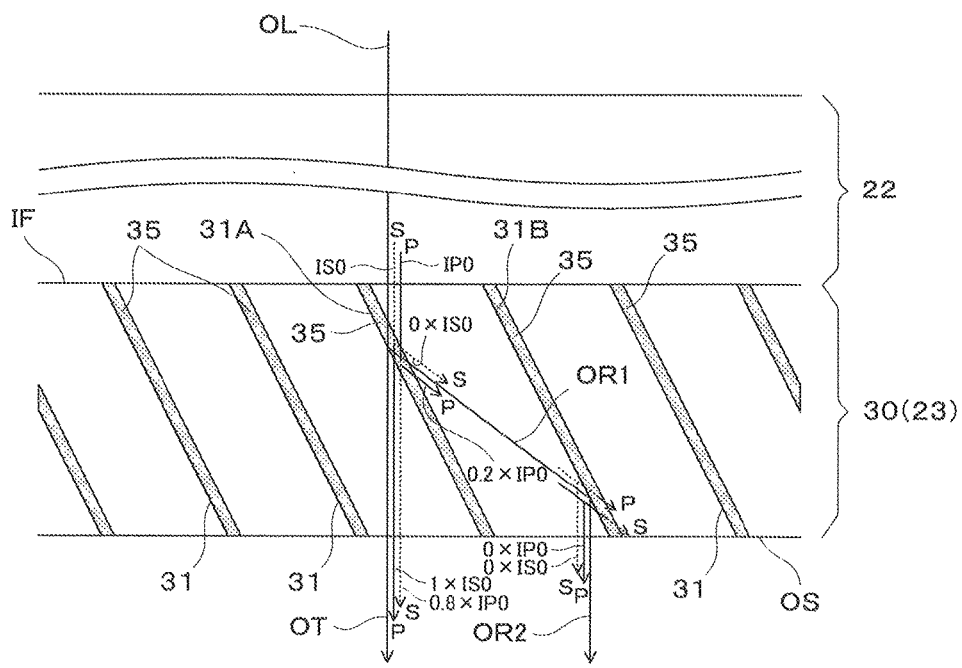
FIG. 17 is a diagram for explaining an example of the processing of the external light by the reflection unit.

FIGS. 16 and 17 are diagrams for explaining functions of a specific configuration example of the plurality of mirrors 31 and the like configuring the reflection unit 30. In this case, the mirrors 31 transmit the P polarized light indicated by a solid line at transmittance $\alpha=1.0$ and transmit the S polarized light indicated by a dotted line at transmittance $\beta=0.8$.

As it is evident from FIG. 16, when the video light GL made incident on the reflection unit 30 substantially equally includes the P polarized light and the S polarized light, the intensity of the transmitted light GT refracted by the first mirror 31A and traveling toward the eye EY is $0.2 \times IS0$. The intensity of the reflected light GR2 refracted by the second mirror 31B and traveling to the eye EY is $0.2 \times IP0$. That is, the video lights GL emitted from the respective display points on the liquid crystal device 11 are made incident around the eye point EPa, where the eye EY is disposed, in a relatively uniform luminance distribution with less relationship with the disposition of the mirrors 31. Therefore, it is possible to prevent unintended vertical streak-like unevenness from being observed in a virtual image seen through the reflection unit 30.

As it is evident from FIG. 17, when the external light OL made incident on the reflection unit 30 substantially equally includes the P polarized light and the S polarized light, the intensity of the transmitted light OT passing straight through the first mirror 31A and traveling toward the eye EY is $0.8 \times IP0 + 1.0 \times IS0$. The intensity of the reflected light OR2 refracted by the second mirror 31B and traveling to the eye EY is zero. That is, irrespective of whether the external light OL is light from the infinity or light from a near object, it is possible to prevent occurrence of a ghost in which images are slightly shifted and superimposed.

In the above explanation, for convenience of explanation, it is assumed that the external light OL is made perpendicularly incident on the principal plane of the reflection unit 30. However, the same functions can be exhibited even if the external light OL is made obliquely incident on the principal plane of the reflection unit 30. For example, a polarized light separation characteristic of the plurality of mirrors 31 configuring the reflection unit 30 only has to be adjusted as appropriate according to incident angles of the external light OL and the video light GL. Even when there is predetermined width in the incident angles, it is possible to uniformly keep the reflectances of the P polarized light and the S polarized light in a degree for not causing a problem. Further, in the above explanation, wavelengths of the external light OL and the video light GL are not explained. However, the external light OL and the video light GL can be set to any wavelengths in a wavelength region of a visible ray. Even when there is predetermined width in the wavelength region of light in this way, it is possible to uniformly keep the reflectances of the P polarized light and the S polarized light in a degree for not causing a problem.

Figure 18:
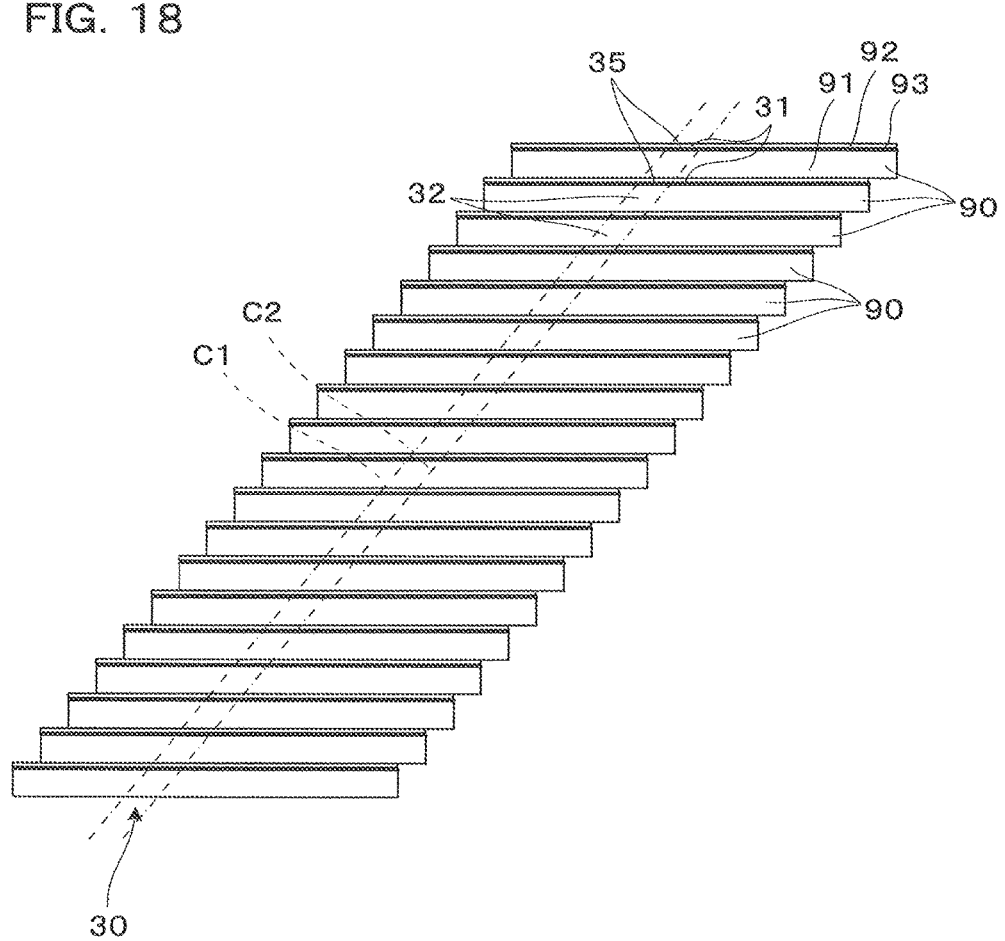
FIG. 18 is a diagram for explaining a manufacturing example of the reflection unit.

An example of a manufacturing method for the reflection unit 30 is explained with reference to FIG. 18. A large number of glass plates 91, which are parallel flat plates made of glass, are prepared in advance. Subsequently, a large number of element plates 90 are prepared by forming dielectric multilayer films 92 on surfaces of the prepared large number of glass plates 91 using vacuum evaporation or the like. In order to realize a desired polarized light separation characteristic, a film material, film thickness, the number of stacked layers, and the like of the dielectric multilayer films 92 are set as appropriate. Further, wavelength plate layers 93 are formed on the dielectric multilayer films 92. In the wavelength plate layers 93, for example, refractive index anisotropy is imparted to an evaporated film by obliquely vapor-depositing an inorganic dielectric material having light transmissivity. A phase difference corresponding to a polarization direction can be given to transmitted light. The wavelength plate layers 93 can be replaced with organic material films having optical anisotropy. The organic material films can be stuck on the dielectric multilayer films 92 by an adhesive. Further, the wavelength plate layers 93 can also be formed by forming stripe pattern-like unevenness structures having a pitch equal to or smaller than a wavelength scale on the dielectric multilayer films 92 by nano-imprint or photolithography and forming films having different refractive indexes on the unevenness structures. After the formation of the wavelength plate layers 93, the formed large number of element plates 90 are stacked while being joined by an adhesive and the entire element plates 90 are obliquely cut along the cutting lines C1 and C2. Consequently, it is possible to obtain the reflection unit 30 having structure in which the mirrors 31 and the wavelength plates 35 formed by the dielectric multilayer films are sandwiched among the block members 32, which are elongated prism pieces obtained by obliquely dividing the parallel flat plates. The reflection unit 30 is stuck to an appropriate place on the observer side of the parallel light guide body 22 via an adhesive and fixed by hardening the adhesive.

Note that, in the above explanation, the dielectric multilayer films 92 and the wavelength plate layers 93 are formed on one side of the principal plane of the glass plate 91. However, it is also possible to form the dielectric multilayer films 92 on one side of the principal plane of the glass plate 91 and form the wavelength plate layers 93 on the other side of the principal plane.

1D. Overview of the Third Embodiment

In the light guide device 20 in the third embodiment explained above, the light guide device 20 includes the plurality of wavelength plates 35 disposed respectively adjacent to the plurality of mirrors 31 and the plurality of mirrors 31 are the reflection elements having the reflectance of the P polarized light lower than the reflectance of the S polarized light. Therefore, it is easy to balance the luminance of the video light GL made incident on the reflection unit 30, reflected on the specific first mirror 31A, and made incident on the eye EY and the luminance of the video light GL transmitted through the specific first mirror 31A, reflected on the second mirror 31B adjacent to the specific first mirror 31A, and made incident on the eye EY. It is possible to suppress vertical streak-like unevenness from being observed in a visible image.

Figure 13:
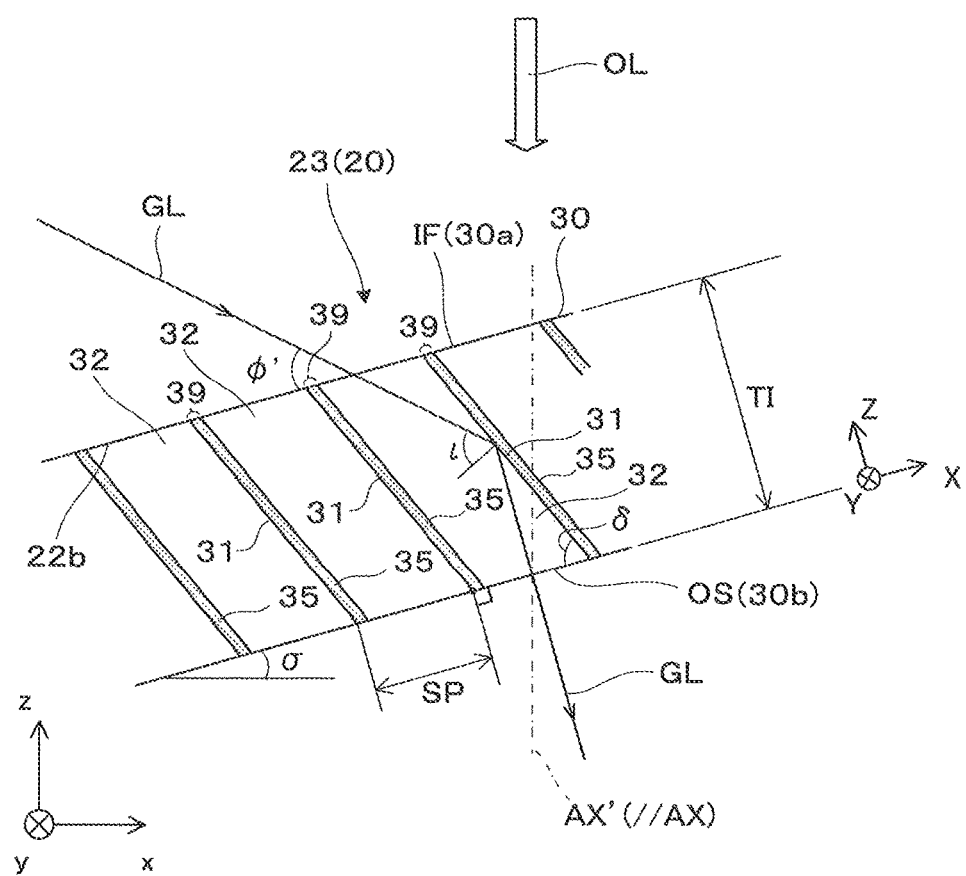
FIG. 13 is a partially enlarged view for explaining disposition of mirrors and the like and a state of an optical path in a reflection unit of a virtual-image display device according to a third embodiment.

The reflection unit 30 provided in the emitting section 23 is not limited to the reflection unit 30 illustrated in FIG. 13. As in the first embodiment, the reflection unit 30 can be formed thick on the incident side close to the incident section 21 and thin on the counter-incident side far from the incident section 21 (see FIG. 9). In this case, the array interval SP of the composite layers 39 configuring the reflection unit 30 is short on the incident side close to the incident section 21 and gradually becomes long on the counter-incident side far from the incident section 21 (see FIG. 9). In the light guide device 20, on the far side from the incident section 21, the angle of elevation φ2 of the video light GL2 is small. By reducing the reflection unit 30 in thickness and widening the array interval SP, it is possible to suppress the number of times the video light GL2 passes through the mirrors 31 and the like from increasing.

The reflection unit 30 provided in the emitting section 23 can be incorporated in an inclined state as in the first embodiment (see FIG. 10). Specifically, the reflection unit 30 can be inclined such that the portion 23h on the inner side far from the incident section 21 is closer to the external environment than the portion 23m on the front side close to the incident section 21. Even if the reflection unit 30 is disposed in the inclined state, if an angle condition is set the same as the example shown in FIGS. 2 to 3, the video light GL reflected on the plane 22a on the external environment side of the parallel light guide body 22 can be reflected on the plurality of mirrors 31 to pass through the light emission surface OS on the observation side. As shown in FIG. 2 and the like, it is possible to form a virtual image.

Fourth Embodiment

A virtual-image display device incorporating a light guide device according to a fourth embodiment of the invention is explained below. Note that the light guide device according to the fourth embodiment is obtained by partially changing the light guide device according to the third embodiment. Explanation is omitted concerning the common portions.

Figure 19:
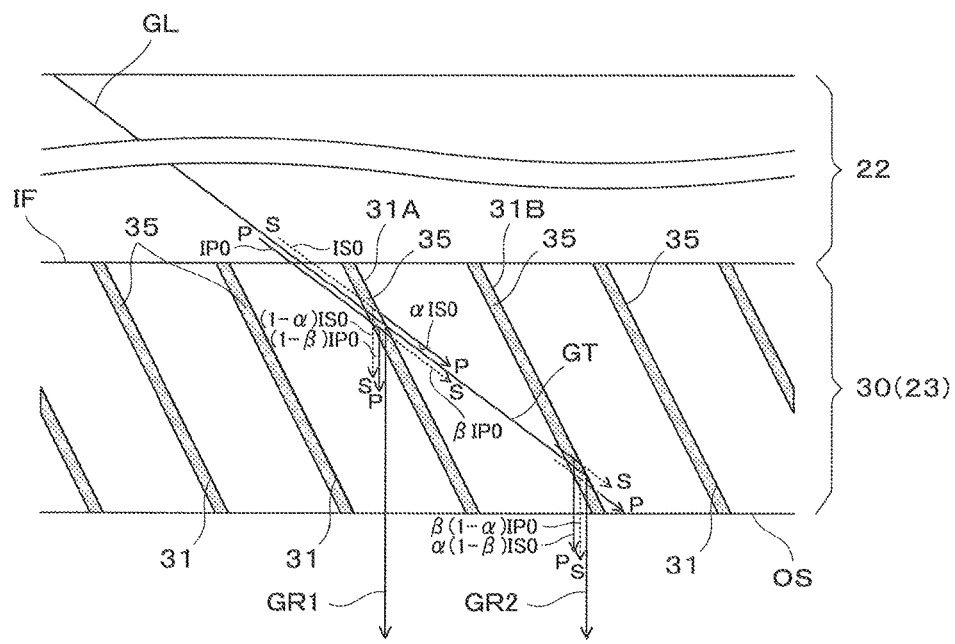
FIG. 19 is a diagram for explaining the structure of a reflection unit of a light guide device according to a fourth embodiment and processing of video light by the reflection unit.
Figure 20:
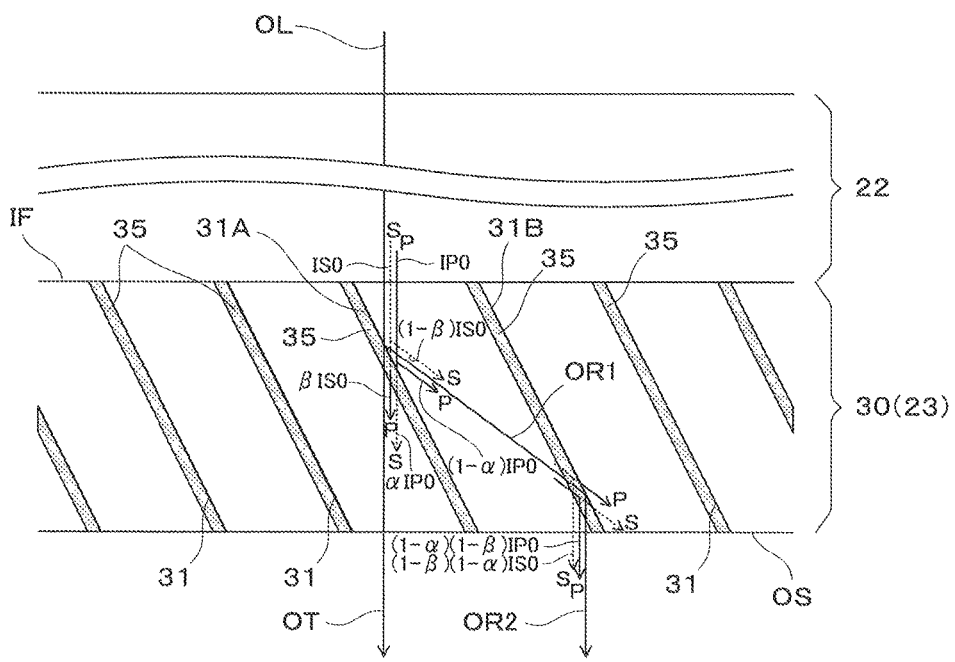
FIG. 20 is a diagram for explaining processing of external light by the reflection unit shown in FIG. 19.

As shown in FIGS. 19 and 20, in the light guide device 20 in this embodiment, in the composite layers 39, the mirrors 31 are disposed on the counter-incident side and the wavelength plates 35 are disposed on the incident side. That is, the wavelength plates 35 are disposed adjacent to the mirrors 31 on the incident side of the mirrors 31. Functions of the mirrors 31 and the wavelength plates 35 are the same as the functions shown in FIGS. 14 and 15.

As shown in FIG. 19, when the video light GL made incident on the reflection unit 30 includes a P polarized light component and an S polarized light component, the polarized light components are separated for distinction of transmission and reflection of the polarized light component by the first mirror 31A. Specifically, when the original intensity of the P polarized light component is represented as IP0 and the original intensity of the S polarized light component is represented as IS0, the reflected light GR1 of the first mirror 31A includes P polarized light having intensity $(1-\beta) \times IP0$ and S polarized light having intensity $(1-\alpha) \times IS0$. The transmitted light GT of the first mirror 31A includes S polarized light having intensity $\beta \times IP0$ and P polarized light having intensity $\alpha \times IS0$. Since the video light GL passes through the wavelength plate 35 as well before incidence on the first mirror 31A, concerning the reflected light GR1, the polarized lights are interchanged twice. The reflected light GR1 returns to the original polarization state. Concerning the transmitted light GT, the S polarized light and the P polarized light are interchanged. Polarized light components of the transmitted light GT from the first mirror 31A are separated for distinction of transmission and reflection of the polarized light component by the second mirror 31B. Specifically, the reflected light GR2 of the second mirror 31B includes P polarized light having intensity $\alpha(1-\beta) \times IS0$ and S polarized light having intensity $\beta(1-\alpha) \times IP0$. Concerning the reflected light GR2, the polarized lights are interchanged twice. The reflected light GR2 returns to the original polarization state. That is, the reflected light GR1 having intensity $((1-\beta) \times IP0+(1-\alpha) \times IS0)$ passed through the first mirror 31A and the reflected light GR2 having intensity $(\alpha(1-\beta) \times IS0 + \beta(1-\alpha) \times IP0)$ passed through the second mirror 31B are made incident on the eye EY of the observer through the reflection unit 30.

The reflectance $Rp=(1-\alpha)$ of the P polarized light of the mirrors 31 is approximately zero. The intensity of the reflected light GR1 from the first mirror 31A is $(1-\beta) \times IP0$. The intensity of the reflected light GR2 from the second mirror 31B is $\alpha(1-\beta) \times IS0$. Transmittance $Rs=\alpha$ of the P polarized light is approximately a value close to 1. If the video light GL substantially equally includes the P polarized light and the S polarized light, the intensity $(1-\beta) \times IP0$ of the reflected light GR1 from the first mirror 31A and the intensity $\alpha(1-\beta) \times IS0 \equiv (1-\beta) \times IS0$ of the reflected light GR2 from the second mirror 31B are considered to be substantially equal.

As explained above, when the intensity of the reflected light GR1 from the first mirror 31A and the intensity of the reflected light GR2 from the second mirror 31B are equal, video lights respectively reflected as S polarized lights on the specific mirror 31A and the adjacent mirror 31B and respectively changed to P polarized lights in the wavelength plates 35 are substantially equally extracted to the eye side. That is, the luminance of the reflected light GR1 or the video light GL reflected on the first mirror 31A and made incident on the eye EY and the luminance of the reflected light GR2 or the video light GL reflected on the second mirror 31B and made incident on the eye EY can be balanced. It is possible to suppress vertical streak-like unevenness from being observed in a visible image.

On the other hand, as shown in FIG. 20, when the external light OL made incident on the reflection unit 30 includes a P polarized light component and an S polarized light component, the polarized light components are separated for distinction of transmission and reflection of the polarized light component by the first mirror 31A. Specifically, when the original intensity of the P polarized light component is represented as IP0 and the original intensity of the S polarized light component is represented as IS0, the transmitted light OT of the first mirror 31A includes P polarized light having intensity $\beta \times IS0$ and S polarized light having intensity $\alpha \times IP0$. The reflected light OR1 of the first mirror 31A includes P polarized light having intensity $(1-\alpha) \times IP0$ and S polarized light having intensity $(1-\beta) \times IS0$. Polarized light components of the reflected light OR1 from the first mirror 31A are separated for distinction of transmission and reflection of the polarized light component by the second mirror 31B. Specifically, the reflected light OR2 of the second mirror 31B includes P polarized light having intensity $(1-\alpha) \cdot (1-\beta) \times IP0$ and S polarized light having intensity $(1-\beta) \cdot (1-\alpha) \times IS0$. That is, the transmitted light OT having intensity $(\beta \times IS0 + \alpha \times IP0)$ passed through the first mirror 31A and the reflected light OR2 having intensity $((1-\alpha) \cdot (1-\beta) \times IP0 + (1-\beta) \cdot (1-\alpha) \times IS0))$ passed through the second mirror 31B are made incident on the eye EY of the observer through the reflection unit 30.

The reflectance $Rp=(1-\alpha)$ of the P polarized light of the mirrors 31 is approximately zero. The intensity of the transmitted light OT from the first mirror 31A is $\beta \times IS0 + \alpha \times IP0$. The intensity of the reflected light OR2 from the second mirror 31B is $0 \times IS0$. As a result, the external light OL made incident on the eye EY of the observer is only the external light OL transmitted through the first mirror 31A. The external light OL passed through the second mirror 31B is substantially absent. When the external light OL reaching the eye EY is formed by only the external light OL transmitted through the first mirror 31A, when a near object is viewed through the reflection unit 30, it is possible to suppress a ghost from being observed because of the reflected light OR2 (that is, indirect light due to double reflection on the mirrors 31).

Figure 21:
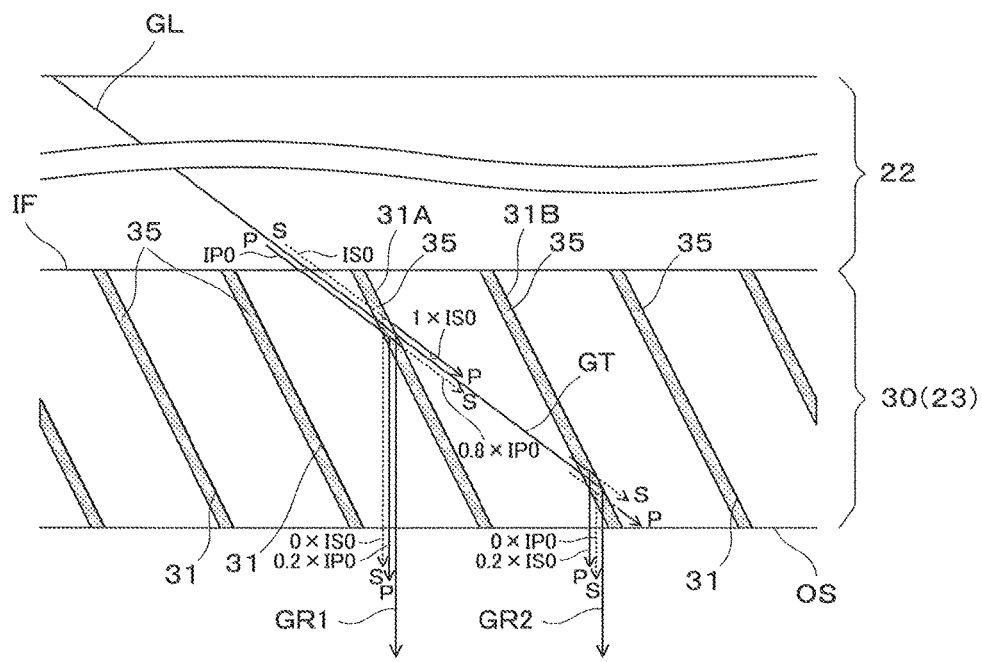
FIG. 21 is a diagram for explaining an example of the processing of the video light by the reflection unit.
Figure 22:
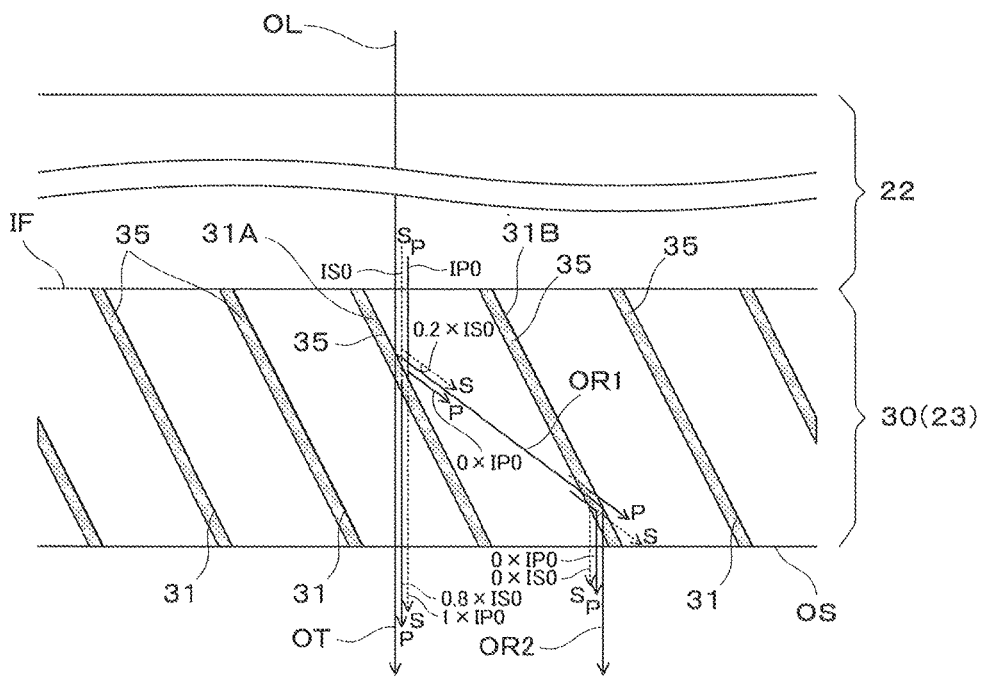
FIG. 22 is a diagram for explaining an example of the processing of the external light by the reflection unit.

FIGS. 21 and 22 are diagrams for explaining functions of a specific configuration example of the plurality of mirrors 31 and the like configuring the reflection unit 30. In this case, the mirrors 31 transmit the P polarized light indicated by a solid line at transmittance $\alpha=1.0$ and transmit the S polarized light indicated by a dotted line at transmittance $\beta=0.8$.

As it is evident from FIG. 21, when the video light GL made incident on the reflection unit 30 substantially equally includes the P polarized light and the S polarized light, the intensity of the transmitted light GT refracted by the first mirror 31A and traveling toward the eye EY is $0.2 \times IP0$. The intensity of the reflected light GR2 refracted by the second mirror 31B and traveling to the eye EY is $0.2 \times IS0$. That is, the video lights GL emitted from the respective display points on the liquid crystal device 11 are made incident around the eye point EPa, where the eye EY is disposed, in a relatively uniform luminance distribution with less relationship with the disposition of the mirrors 31. Therefore, it is possible to prevent unintended vertical streak-like unevenness from being observed in a virtual image seen through the reflection unit 30.

As it is evident from FIG. 22, when the external light OL made incident on the reflection unit 30 substantially equally includes the P polarized light and the S polarized light, the intensity of the transmitted light OT passing straight through the first mirror 31A and traveling toward the eye EY is $0.8 \times IS0 + 1.0 \times IP0$. The intensity of the reflected light OR2 refracted by the second mirror 31B and traveling to the eye EY is zero. That is, irrespective of whether the external light OL is light from the infinity or light from a near object, it is possible to prevent occurrence of a ghost in which images are slightly shifted and superimposed.

Fifth Embodiment

A virtual-image display device incorporating a light guide device according to a fifth embodiment of the invention is explained below. Note that the light guide device according to the fifth embodiment is obtained by partially changing the light guide device according to the third embodiment. Explanation is omitted concerning the common portions.

As in the second embodiment, the virtual-image display device 100 in this embodiment includes, as an element incidental to the light guide device 20, the shade member 60 that covers the external environment side of the light guide device 20 (see FIG. 11). The fifth embodiment and the second embodiment are common in terms of drawings.

Therefore, FIG. 11 is referred to below. The shade member 60 that covers the light guide device 20 is detachably fixed to the light guide device 20 via a not-shown frame. The shade member 60 has a polarization characteristic deviating to a predetermined direction. For example, the transmittance of P polarized light is lower than the transmittance of S polarized light. In the case of the virtual-image display device 100 in this embodiment, transmission of the P polarized light, in which an electric field vibrates in the lateral direction, is suppressed by the shade member 60. Therefore, it is easy to observe the external light OL including reflection on a water surface, window glass, and the like. Note that, concerning the polarization characteristic of the shade member 60, the P polarized light and the S polarized light are based on the mirrors 31 of the light guide device 20. That is, in the shade member 60, the transmittance of the P polarized light, which is an electric field component in a first direction (equivalent to the x-axis direction) substantially parallel to the light guide direction of the parallel light guide body 22 (that is, the X-axis direction), in the external light OL is lower than the transmittance of the S polarized light, which is an electric field component in a second direction (equivalent to the y-axis direction) orthogonal to the first direction, in the external light OL. Note that the polarization characteristic of the shade member 60 can be changed as appropriate according to a method of use. For example, the transmittance of the S polarized light may be lower than the transmittance of the P polarized light.

Others

The invention is explained above according to the embodiments. However, the invention is not limited to the embodiments and can be carried out in various forms in a range not departing from the spirit of the invention. For example, modifications explained below are also possible.

For example, the light guide device 20 provided in the virtual-image display device 100 in the embodiments totally reflects, in the parallel light guide body 22, the video light GL on the plane 22a only once and guides the video light GL to the reflection unit 30. However, the light guide device 20 can also totally reflect the video light GL on the opposed planes 22a and 22b a plurality of times and guide the video light GL to the reflection unit 30. For example, after the reflection on the plane 22b, the light guide device 20 can reflect the video light GL on the plane 22a and guide the video light GL to the reflection unit 30. Further, the light guide device 20 can reflect the video light GL three or more times with the planes 22a and 22b and guide the video light GL to the reflection unit 30. However, in this case, it is necessary to finally reflect the video light GL on the plane 22a on the front side and guide the video light GL to the reflection unit 30. Besides, concerning the number of times of the total reflection performed until the video light GL reaches the emitting section 23, it is not essential to set the number of times of the total reflection the same in all the video lights GL. It is possible to combine the video lights GL having different numbers of times of reflection on the planes 22a and 22b to display an image.

The reflectances of the large number of mirrors 31 provided in the reflection unit 30 are set the same in principle. However, the reflectance or the polarized light separation characteristic of the mirrors 31 can also be changed from the incident side close to the incident section 21 to the counter-incident side. Similarly, a phase change amount by the large number of wavelength plates 35 can also be gradually changed from the incident side to the counter-incident side.

In the above explanation, the transmissive liquid crystal device 11 is used as the video element. However, the video element is not limited to the transmissive liquid crystal device. Various devices can be used as the video element. For example, a reflective liquid crystal panel can also be used. A digital micro-mirror device and the like can also be used instead of the liquid crystal device 11. Self-emitting elements represented by an organic EL, an LED array, and an organic LED can also be used. Further, a laser scanner obtained by combining a laser beam source and a scanner such as a polygon mirror can also be used.

For example, as shown in FIG. 12, the polarization element 71 can be disposed on the optical path of the video light GL in the light guide device 20. The polarization element 71 also functions as the reflection surface RS of the incident section 21 and is an optical element that gives a polarization characteristic deviating to a predetermined direction. For example, the polarization element 71 is obtained by coating the rear surface of a reflective polarization filter or a transmissive polarization filter, which is formed of, for example, an organic material or an inorganic material, with a mirror. By incorporating the polarization element 71, when the liquid crystal device 11 emits polarized light as the video light GL, it is possible to improve deviation concerning the polarized light of the video light GL. Specifically, the video light GL made incident on the reflection unit 30 can be limited to the S polarized light. When a device that emits the video light GL not having a polarization characteristic is used as the video element, a role for aligning a polarization direction of the video light GL in a specific direction can be imparted to the device.

In the above explanation, in the virtual-image display device 100, one set of the image forming device 10 and the light guide device 20 is provided for each of the right eye and the left eye. However, the image forming device 10 and the light guide device 20 may be provided for only one of the left eye and the right eye to view an image with one eye.

In the above specific explanation, it is assumed that the virtual-image display device 100 in this embodiment is the head mounted display. However, the virtual-image display device 100 in the embodiment can also be applied to a head-up display, a binocular type hand-held display, and the like.

In the above explanation, in the planes 22a and 22b of the parallel light guide body 22 or the like or the curved surface 21b, the video light is totally reflected and guided by the interface with the air without providing a mirror, a half mirror, or the like on the surface. However, the total reflection in the invention includes reflection achieved by forming a mirror coat or a half mirror film in the entire or a part of the planes 22a and 22b. For example, the total reflection includes, after an incident angle of the video light GL satisfies a total reflection condition, applying a mirror coat or the like in a part of the planes 22a and 22b and reflecting substantially the entire video light.

In the above explanation, the parallel light guide body 22 is formed laterally long in the X direction or the x direction and the light incident surface IS is formed to be located on the lateral direction outer side of the eye. However, the position of the light incident surface IS is not limited to this as long as the video light GL can be appropriately guided into the light guide device 20. The light incident surface IS can be provided in, for example, a part of the upper end face TP or the lower end face BP present above or below the light guide device 20. In this case, the reflection unit 30 is rotated 90° around the optical axis AX in front of the eye. Note that, when the shade member 60 is added to the light guide device 20 changed in the direction in this way, in the shade member 60, the transmittance of the P polarized light, which is the electric field component in the first direction (that is, the longitudinal direction) substantially parallel to the light guide direction of the parallel light guide body 22, in the external light OL is higher than the transmittance of the S polarized light, which is the electric field component in the second direction (that is, the lateral direction) orthogonal to the first direction, in the external light OL.

Although not explained above, the upper end face TP, the lower end face BP, and the like in the outer circumferential section defining the external shape in the parallel light guide body 22 can be formed as black paint applied surfaces or sandblast machined surfaces. Further, black paint application or sandblast machining may be applied to places other than the upper end face TP and the lower end face BP. The black paint application or the sandblast machining may be applied to only a part of the upper end face TP, the lower end face BP, and the like.

In the third embodiment, in the explanation referring to FIGS. 14 and 16 and the like, the video light GL made incident on the reflection unit 30 substantially equally includes the P polarized light and the S polarized light. However, in some case, a video element such as the liquid crystal device 11 does not emit the P polarized light and the S polarized light in a balanced state. In this case, if the wavelength plates 35 are not formed as the half wavelength plates and an adjustment amount of a phase difference is changed, it is possible to impart the same functions to the composite layers 39 or the wavelength plates 35.

Figure 23:
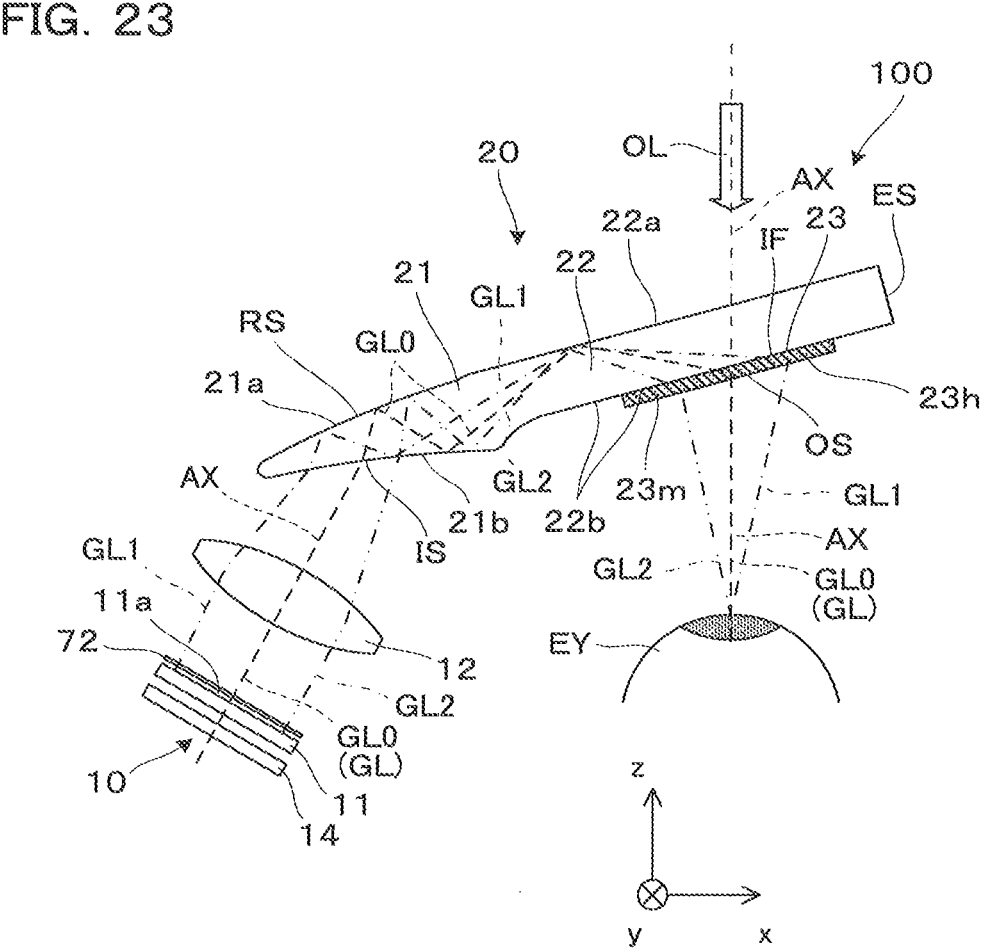
FIG. 23 is a sectional view for explaining a modification of the light guide device.
Figure 24:
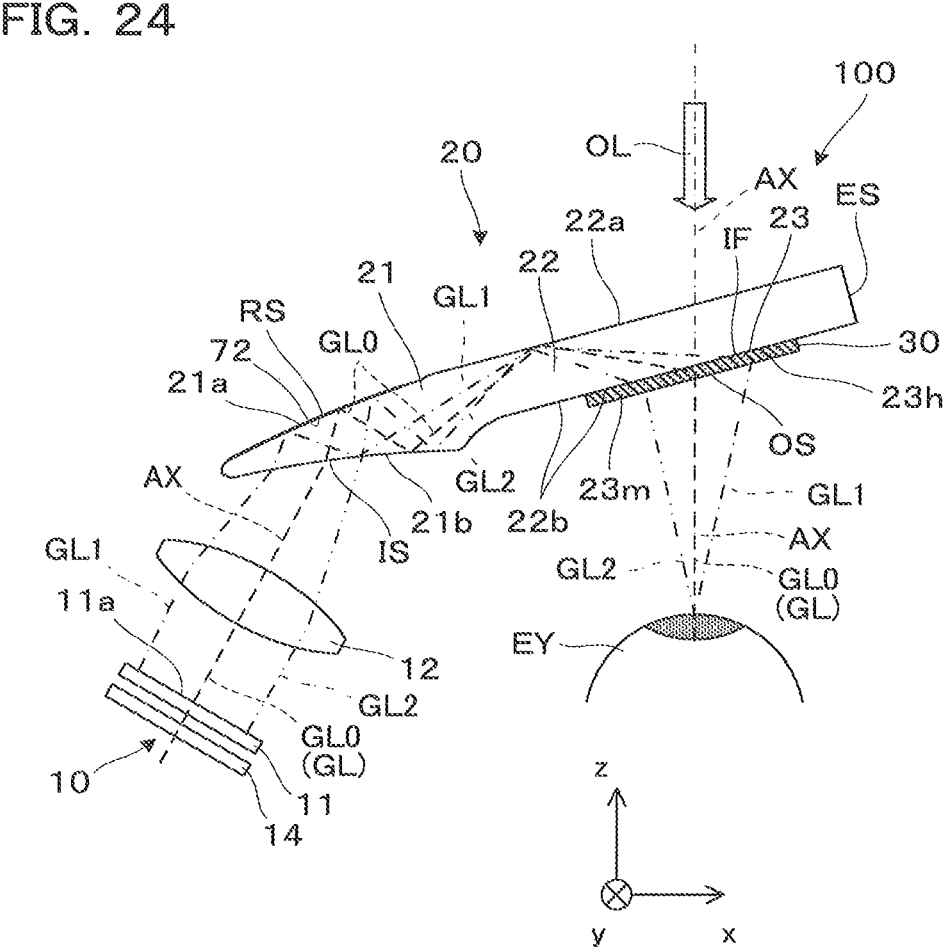
FIG. 24 is a sectional view for explaining another modification of the light guide device.

For example, as shown in FIG. 23, a polarization eliminating element 72 can be disposed on the optical path of the video light GL in the virtual-image display device 100. In this case, the polarization eliminating element 72 is disposed in a post-stage of the liquid crystal device 11 to be opposed to the liquid crystal device 11. The polarization eliminating element 72 is an optical element that changes the video light GL having a polarization characteristic deviating to a pre-determined direction to video light equally including the P polarized light and the S polarized light. As shown in FIG. 24, the polarization eliminating element 72 can also be disposed on the optical path of the video light GL in the light guide device 20. In this case, the polarization eliminating element 21 is disposed between a member that forms the reflection surface RS and the incident section 21. As the polarization eliminating element 21, a diffraction grating in which sub-wavelength gratings are two-dimensionally arrayed can be used besides, for example, an element including a random local orientation phase difference member including a refractive index anisotropy material and locally oriented in a different direction, an element including a high phase difference film, or an element that makes use of refractive index anisotropy of liquid crystal. Note that, in the diffraction grating, the sub-wavelength gratings have stripe pattern-like unevenness structure having a pitch equal to or smaller than a wavelength scale. In the sub-wavelength gratings two-dimensionally arrayed, extending directions of the pitch and the stripe are set to be different. By incorporating the polarization eliminating element 72, for example, when the liquid crystal device 11 emits polarized light as the video light GL, it is possible to satisfactorily eliminate deviation concerning the polarized light of the video light GL. Specifically, it is possible to change the video light GL made incident on the reflection unit 30 to video light substantially equally including the S polarized light and the P polarized light.

In the above explanation concerning the third embodiment, the mirrors 31 and the wavelength plates 35 do not have to be in contact with each other. The wavelength plates 35 may be slightly separated from the mirrors 31 as long as the mirrors 31 and the wavelength plates 35 are adjacent to each other. The wavelength plates 35 being disposed to be adjacent to the mirrors 31 includes, besides the wavelength plates 35 being in contact with the mirrors 31, the wavelength plates 35 being close to and slightly separated from the mirrors 31. Since the wavelength plates 35 are adjacent to the mirrors 31, for example, it is possible to prevent generation of unintended light that passes through the mirrors 31 but is not made incident on the wavelength plates 35 corresponding to the mirrors 31. However, for example, when the mirrors 31 and the wavelength plates 35 are in contact as shown in FIG. 14, it is possible to more surely prevent the generation of the unintended light. Note that, when the mirrors 31 and the wavelength plates 35 are separated, the distance between the mirrors 31 and the wavelength plates 35 is desirably equal to smaller than approximately 10% of the array interval SP of the mirrors 31.

The entire disclosure of Japanese Patent Application Nos. 2016-043089, filed Mar. 7, 2016 and 2016-043090, filed Mar. 7, 2016 are expressly incorporated by reference herein.

What is claimed is:

1. A light guide device comprising:
   a light guide body including a pair of opposed surfaces corresponding to an observer side and an external environment side;
   an incident section provided on one end side of the light guide body;
   an emitting section provided on the other end side of the light guide body, the emitting section including a reflection unit having:
      a plurality of mirrors disposed in an array that respectively emit video lights received from the incident section to the observer side, the plurality of mirrors being reflection elements having reflectance of P polarized light lower than reflectance of S polarized light; and
   a shade member that covers the exterior environment side of the light guide body and having the transmittance of the P polarized light based on the mirrors higher than the transmittance of the S polarized light based on the mirrors.

2. The light guide device according to claim 1, wherein the plurality of mirrors allow each of the video lights to pass through twice at most.

3. The light guide device according to claim 1, wherein
   the pair of surfaces of the light guide body extend substantially parallel to each other,
   the plurality of mirrors are inclined to the incident section side toward the external environment side in order to reflect the video lights reflected on the external environment side of the light guide body and respectively emit the video lights to the observer side,
   the light guide device is used in combination with a shade member that covers the external environment side of the light guide body, and
   in the shade member, the transmittance of the P polarized light, which is an electric field component in a first direction substantially parallel to a light guide direction of the light guide body, in external light is higher than the transmittance of the S polarized light, which is an electric field component in a second direction crossing the first direction, in the external light.

4. A virtual-image display device comprising:
   a video element configured to generate video light; and
   the light guide device according to claim 1.

5. The virtual-image display device according to claim 4, wherein video light having a polarization characteristic deviating to a predetermined direction is emitted from the video element such that the video light in a state deviating to S polarized light can be made incident on the reflection unit through the light guide body.

6. The virtual-image display device according to claim 4, wherein an optical element is present that gives a polarization characteristic deviating to a predetermined direction to an optical path extending from the video element to the plurality of mirrors through an optical surface of the light guide body such that the video light in a state deviating to S polarized light can be made incident on the reflection unit through the light guide body.

7. The light guide device according to claim 1, wherein the reflection unit includes a plurality of wavelength plates disposed to respectively correspond to the plurality of mirrors.

8. The light guide device according to claim 7, wherein the wavelength plates are disposed adjacent to the mirrors.

9. The light guide device according to claim 8, wherein the wavelength plates are disposed, with respect to the mirrors, on a counter-incident side away from the incident section.

10. The light guide device according to claim 8, wherein the wavelength plates are disposed, with respect to the mirrors, on an incident side where the incident section is present.

11. The light guide device according to claim 7, wherein the wavelength plates are half wavelength plates.

12. A virtual-image display device comprising:
a video element configured to generate video light; and
the light guide device according to claim 7.

13. The light guide device according to claim 1, wherein the plurality of mirrors are respectively formed by at least one dielectric multilayer film.

14. The light guide device according to claim 1, wherein, when the reflectance of the P polarized light of the mirrors is represented as Rp and the reflectance of the S polarized light of the mirrors is represented as Rs, following conditional expressions (1) and (2) are satisfied:

$$Rp < 0.05 \quad (1)$$

$$Rp < 0.5 \times Rs \quad (2).$$

15. The light guide device according to claim 1, wherein
the pair of surfaces of the light guide body extend substantially in parallel to each other, and
the plurality of mirrors are inclined to the incident section side toward the external environment side in order to reflect the video lights reflected on the external environment side of the light guide body and respectively emit the video lights to the observer side.

16. The light guide device according to claim 1, wherein an incident angle of the video lights on the mirrors is equal to or larger than 40°.

17. The light guide device according to claim 1, further comprising a shade member configured to cover the external environment side of the light guide body and have a polarization characteristic deviating to a predetermined direction such that the video light in a state deviating to S polarized light can be made incident on the reflection unit through the light guide body.

18. A light guide device comprising:
a light guide body including a pair of opposed surfaces corresponding to an observer side and an external environment side;
an incident section provided on one end side of the light guide body; and
an emitting section provided on the other end side of the light guide body, the emitting section including a reflection unit having:
a plurality of mirrors disposed in an array that respectively emit video lights received from the incident section to the observer side, the plurality of mirrors being reflection elements having reflectance of P polarized light lower than reflectance of S polarized light; wherein:
the pair of surfaces of the light guide body extend substantially parallel to each other,
the plurality of mirrors are inclined to the incident section side toward the external environment side in order to reflect the video lights reflected on the external environment side of the light guide body and respectively emit the video lights to the observer side,
the light guide device is used in combination with a shade member that covers the external environment side of the light guide body, and
in the shade member, the transmittance of the P polarized light, which is an electric field component in a first direction substantially parallel to a light guide direction of the light guide body, in external light is higher than the transmittance of the S polarized light, which is an electric field component in a second direction crossing the first direction, in the external light.

19. A light guide device comprising:
a light guide body including a pair of opposed surfaces corresponding to an observer side and an external environment side;
an incident section provided on one end side of the light guide body; and
an emitting section provided on the other end side of the light guide body, the emitting section including a reflection unit having:
a plurality of mirrors disposed in an array that respectively emit video lights received from the incident section to the observer side, the plurality of mirrors being reflection elements having reflectance of P polarized light lower than reflectance of S polarized light, and
a plurality of wavelength plates disposed to respectively correspond to the plurality of mirrors.

20. A light guide device comprising:
a light guide body including a pair of opposed surfaces corresponding to an observer side and an external environment side;
an incident section provided on one end side of the light guide body; and
an emitting section provided on the other end side of the light guide body, the emitting section including a reflection unit having:
a plurality of mirrors disposed in an array that respectively emit video lights received from the incident section to the observer side, the plurality of mirrors being reflection elements having reflectance of P polarized light lower than reflectance of S polarized light, the plurality of mirrors being respectively formed by at least one dielectric multilayer film.

21. A light guide device comprising:
a light guide body including a pair of opposed surfaces corresponding to an observer side and an external environment side;
an incident section provided on one end side of the light guide body;

an emitting section provided on the other end side of the light guide body, the emitting section including a reflection unit having:
  a plurality of mirrors disposed in an array that respectively emit video lights received from the incident section to the observer side, the plurality of mirrors being reflection elements having reflectance of P polarized light lower than reflectance of S polarized light; and
a shade member configured to cover the external environment side of the light guide body and have a polarization characteristic deviating to a predetermined direction such that the video light in a state deviating to S polarized light can be made incident on the reflection unit through the light guide body.

* * * * *